US011945898B2

(12) United States Patent
Serrano et al.

(10) Patent No.: US 11,945,898 B2
(45) Date of Patent: *Apr. 2, 2024

(54) FUNCTIONAL POLYMER

(71) Applicant: SUSOS AG, Duebendorf (CH)

(72) Inventors: Angela Serrano, Zurich (CH); Stefan Zuercher, Zurich (CH); Samuele Tosatti, Duebendorf (CH)

(73) Assignee: SUSOS AG, Dübendorf (CH)

( * ) Notice: Subject to any disclaimer, the term of this patent is extended or adjusted under 35 U.S.C. 154(b) by 148 days.

This patent is subject to a terminal disclaimer.

(21) Appl. No.: 17/105,846

(22) Filed: Nov. 27, 2020

(65) Prior Publication Data

US 2021/0087309 A1 Mar. 25, 2021

Related U.S. Application Data

(62) Division of application No. 15/510,409, filed as application No. PCT/EP2014/002453 on Sep. 11, 2014, now Pat. No. 10,882,931.

(51) Int. Cl.
*C08F 8/32* (2006.01)
*C08F 8/40* (2006.01)
(Continued)

(52) U.S. Cl.
CPC .................. *C08F 8/32* (2013.01); *C08F 8/40* (2013.01); *C08F 8/44* (2013.01); *C08F 22/18* (2013.01);
(Continued)

(58) Field of Classification Search
CPC ............ C08F 2220/60; C08F 2220/603; C08F 2220/606; C08F 12/20; C08F 8/32;
(Continued)

(56) References Cited

U.S. PATENT DOCUMENTS

| 8,568,872 B2 | 10/2013 | Textor et al. |
| 2009/0076241 A1 | 3/2009 | Lee |

(Continued)

FOREIGN PATENT DOCUMENTS

| JP | 2008308658 A | * 12/2008 |
| JP | 2009-536976 A | 10/2009 |

(Continued)

OTHER PUBLICATIONS

Wang et al., "Influence of Binding-Site Density in Wet Bioadhesion," Adv. Mater. 20, 3872-3876 (2006).*

(Continued)

*Primary Examiner* — Kregg T Brooks
(74) *Attorney, Agent, or Firm* — Oliff PLC

(57) ABSTRACT

A functional polymer including at least two different types of side chains, having the general formula (1),

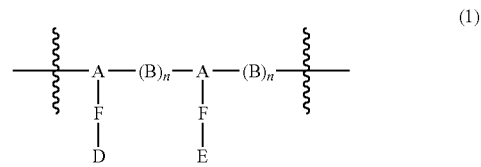

wherein A is an at least monosubstituted alkylene or arylene group; B is an amide, ester or ether group and n is 0 or 1; F is selected from: an ester, secondary amine, amide, ether, thio ether, thio ester, and may be the same or different for the different side chains; D is a side chain intended to reversible bind to a substrate or has a coating function; E is a side chain intended to irreversible bind to a substrate, the side chain E and polymer includes 1 to 10 different side chains D and 1 to 10 different side chains E, but at least one of each, and (Continued)

Figure 1:
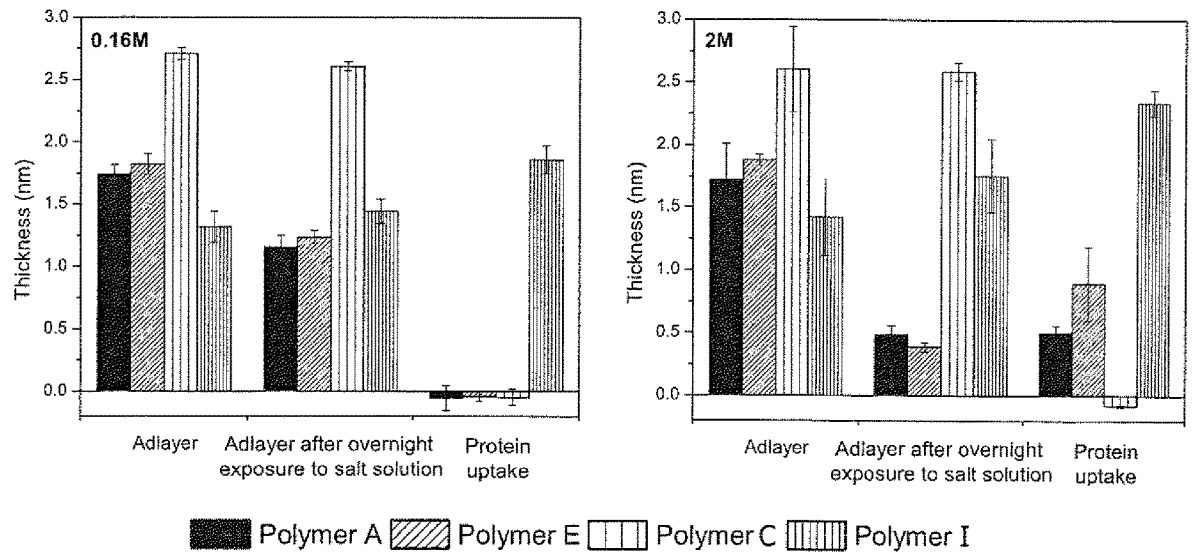

includes a plurality of each type, whereby the different types of side chains are randomly or regularly distributed in the polymer.

16 Claims, 4 Drawing Sheets

(51) Int. Cl.
| | |
|---|---|
| C08F 8/44 | (2006.01) |
| C08F 22/18 | (2006.01) |
| C08F 120/22 | (2006.01) |
| C08F 120/24 | (2006.01) |
| C08G 63/00 | (2006.01) |
| C08G 63/91 | (2006.01) |
| C08G 65/00 | (2006.01) |
| C08G 65/329 | (2006.01) |
| C08G 69/00 | (2006.01) |
| C08G 69/48 | (2006.01) |
| C08G 81/02 | (2006.01) |
| C08L 71/02 | (2006.01) |
| C09D 5/16 | (2006.01) |
| C09D 133/14 | (2006.01) |
| C09D 133/16 | (2006.01) |
| C09D 133/26 | (2006.01) |
| C09D 171/02 | (2006.01) |
| C09D 201/02 | (2006.01) |
| C08F 220/60 | (2006.01) |

(52) U.S. Cl.
CPC .......... *C08F 120/22* (2013.01); *C08F 120/24* (2013.01); *C08G 63/00* (2013.01); *C08G 63/91* (2013.01); *C08G 65/00* (2013.01); *C08G 65/329* (2013.01); *C08G 69/00* (2013.01); *C08G 69/48* (2013.01); *C08G 81/025* (2013.01); *C08L 71/02* (2013.01); *C09D 5/16* (2013.01); *C09D 5/1656* (2013.01); *C09D 133/14* (2013.01); *C09D 133/16* (2013.01); *C09D 133/26* (2013.01); *C09D 171/02* (2013.01); *C09D 201/02* (2013.01); *C08F 220/603* (2020.02); *C08F 220/606* (2020.02); *C08F 2438/03* (2013.01); *C08G 2650/50* (2013.01)

(58) Field of Classification Search
CPC ........ C08F 20/58; C08F 20/60; C08F 220/58; C08F 220/60; C08F 220/603; C08F 220/606; C08F 22/18; C08F 8/00; C08F 8/40; C08F 8/42; C08G 69/48; C08G 65/329–337; C08G 65/91–918; C08G 63/91–918

See application file for complete search history.

(56) References Cited

U.S. PATENT DOCUMENTS

| | | |
|---|---|---|
| 2009/0182061 A1 | 7/2009 | Moro et al. |
| 2010/0022662 A1 | 1/2010 | Gobelt et al. |

FOREIGN PATENT DOCUMENTS

| | | |
|---|---|---|
| JP | 2010-070735 A | 4/2010 |
| JP | 2010-514863 A | 5/2010 |
| JP | 2012-233059 A | 11/2012 |
| JP | 2013-063561 A | 4/2013 |
| WO | 2007/022645 A1 | 3/2007 |
| WO | 2009/070745 A1 | 6/2009 |
| WO | 2011/129854 A1 | 10/2011 |

OTHER PUBLICATIONS

Chua et al., "Synthesis and Thermoresponsive Solution Properties of Poly[oligo(ethylene glycol) (meth)acrylamide]s: Biocompatible PEG Analogues," Macromolecules 45(3), 1362-1374 (2012).*
Eberhardt et al., "Synthesis of pentafluorophenyl(meth)acrylate polymers: New precursor polymers for the synthesis of multifunctional materials," Eur. Polym. J. 41, 1569-1575 (2005).*
Partial machine translation of JP 2008-308658 A (2008).*
May 18, 2015 International Search Report issued in International Patent Application No. PCT/EP2014/002453.
Tahir et al., "Overcoming the Insolubility of Molybdenum Disulfide Nanoparticles through a High Degree of Sidewall Functionalization Using Polymeric Chelating Ligands", Angewandte Chemie, 118, pp. 4927-4933, 2006.
Tahir et al., "Reactive Polymers: A Versatile Toolbox for the Immobilization of Functional Molecules on TiO2 Nanoparticles", Angewandte Chemie, 118, pp. 922-926, 2006.
Meuer et al., "Liquid Crystalline Phases from Polymer-Functionalized TiO2 Nanorods", Advanced Materials, pp. 2073-2078, 2007.
Tahir et al., "Hierarchical Assembly of TiO2 Nanoparticles on WS2 Nanotubes Achieved Through Multifunctional Polymeric Ligands", Small, pp. 829-834, 2007.
Barz et al., "From Defined Reactive Diblock Copolymers to Functional HPMA-Based Self-Assembled Nanoaggregates", Biomacromolecules, pp. 3114-3118, 2008.
Eberhardt et al., "RAFT Polymerization of Pentafluorophenyl Methacrylate: Preparation of Reactive Linear Diblock Copolymers", pp. 1488-1493, 2005.
Nishida et al., "Gelation and Adhesion Behavior of Mussel Adhesive Protein Mimetic Polymer", Journal of Polymer Science, Polymer Chemistry, pp. 1058-1065, 2013.
Mammen et al., "Effective Inhibitors of Hemagglutination by Influenza Virus Synthesized from Polymers Having Active Ester Groups. Insight into Mechanism of Inhibition", American Chemical Society, pp. 4179-4190, 1995.
Jochum et al., "Temperature- and Light-Responsive Polyacrylamides Prepared by a Double Polymer Analogous Reaction of Activated Ester Polymers", pp. 5941-5945, 2009.
Saxer et al., "Surface Assembly of Catechol-Functionalized Poly(L-lysine)-graft-poly(ethylene glycol) Copolymer on Titanium Exploiting Combined Electrostatically Driven Self-Organization and Biomimetic Strong Adhesion" American Chemical Society, Macromolecules, pp. 1050-1060, 2010.
Mar. 14, 2017 International Preliminary Report on Patentability issued in International Patent Application No. PCT/EP2014/002453.
Ham et al., "Facile DNA Immobilization on Surfaces Through a Catecholamine Polymer," Angew. Chem. Int. Ed. 50, 732-736 (2011)("Ham") with Supporting Information.
Heo et al., "Bioinspired self-adhesive polymer for surface modification to improve antifouling property," J. Coat. Technol. Res. 10, 811-819 (2013).
Menyo et al., "Synthesis and Characterization of Water-Soluble Polymer with Pendant Nitrocatecholic Functionalities," PMSE Preprints (2012).

* cited by examiner

FUNCTIONAL POLYMER

This application is a Divisional of application Ser. No. 15/510,409, filed Mar. 10, 2017, which is a National Stage of PCT/EP2014/002453, filed Sep. 11, 2014. The entire contents of the prior applications are hereby incorporated by reference herein in their entirety.

The present invention relates to a functional polymer for coating of different substrates.

Surface modification is a well-known strategy to modify a material's physicochemical properties. Among the various surface treatment possibilities, the application of a coating is a simple and straightforward manner to add new functionalities and properties to a base material.

Ultra-thin polymeric coatings are normally generated according to two different processes. In the bottom-up or grafting-from approach polymers are grown from the surface thanks to polymerization reactions between a surface deposited reactive agent and the monomers present in the solution where the to be coated materials are dipped in. In the other case, bottom-down or grafting-to, the previously synthesized molecules are assembled onto the surface from a liquid or gas phase.

Macromolecules, 43, 2010, 1050-1060 discloses a class of polymers based on the polycationic poly(L-lysine)-graft-poly(ethylene glycol) copolymer (PLL-g-PEG) with a fraction of the amine-terminated lysine side chains covalently conjugated to 3,4-dihydroxyphenylacetic acid (DHPAA). This copolymer is shown to adsorb and self-organize as a confluent monolayer on negatively charged titanium oxide surfaces.

However, the synthesis of said copolymer is difficult and expensive, also due to the charge in the polymer backbone. In addition, it is not possible to easily amend the side chains depending on the intended use.

U.S. Pat. No. 8,568,872 discloses a polymer comprising a plurality of anchoring molecules, in particular polymers comprising catechol side chains. Due to the absence of another binding group, said polymer is not compatible with all different substrates. For example a strong binding with for example SiO$_2$ substrates is not possible. It is therefore an object of the present invention to provide a polymer comprising side chains with different binding affinities to several types of substrates.

The problem is solved by the polymer according to claim 1. Further preferred embodiments are subject of the dependent claims.

The functional polymer according to the present invention comprises at least two different types of side chains, said polymer having the general formula (1),

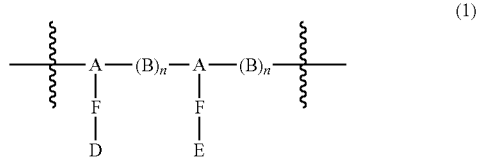

(1)

wherein
A is an at least monosubstituted alkylene or arylene group,
B is an amide, an ester or an ether group and n is either 0 or 1,
F is selected from the group of an ester, a secondary amine, an amide, an ether, a thio ether, a thio ester, and may be the same or different for the different types of side chains,
D is a side chain which is intended to reversible bind to a substrate or carries a coating functionality, and D is selected from the group consisting of
a short chain side chain D1 having a linear or branched, substituted or unsubstituted $C_1$ to $C_{12}$ alkyl group $R_{D1}$, which optionally comprises heteroatoms, and which carries a functional group K1;
a side chain D2 having a long chain $R_{D2}$ selected from the group consisting of polydimethylsiloxanes, perfluoroethers, perfluoroalkyls, polyisobutene, polyethylene glycol, polydimethylacrylamide, polyvinylpyrrolidone, polyalkyloxazolines, dextran, carboxymethyl dextran, poly(N-isopropylacrylamide), poly(N-hydroxyethylacrylamide, poly(2-hydroxyethyl methacrylate), poly-hydroxypropylmethacrylate), poly-(methacryloyloxyethyl phosphorylcholine), poly-(sulfobetaine methacrylate), poly-alkylene residues having more than 20 carbon atoms, peptide chains, DNA fragments and poly-(sulfobetaine acrylamide), whereby D2 has no functional end group or side group;
a side chain D3 having a long chain $R_{D3}$ selected from the group consisting of polydimethylsiloxanes, perfluoroethers, perfluoroalkyls, polyisobutene, polyethylene glycol, polydimethylacrylamide, polyvinylpyrrolidone, polyalkyloxazolines, dextran, carboxymethyl dextran, poly(N-isopropylacrylamide), poly(N-hydroxyethylacrylamide, poly(2-hydroxyethyl methacrylate), poly-hydroxypropylmethacrylate), poly-(methacryloyloxyethyl phosphorylcholine), poly-(sulfobetaine methacrylate), poly-alkylene residues having more than 20 carbon atoms, peptide chains, DNA fragments and poly-(sulfobetaine acrylamide) and D3 carries at least one functional end or at least one functional side group K3,
E is a side chain which is intended to irreversible bind to a substrate, said side chain E
having a linear or branched, substituted or unsubstituted $C_1$ to $C_{20}$, preferably $C_1$ to $C_{12}$ alkyl group $R_E$, which optionally comprises heteroatoms, and carries at least one functional group K4, or
is the functional group K4, and
the polymer comprising 1 to 10 different types of side chains D and 1 to 10 different types of side chains E, but at least one type of side chain D and at least one type of side chain E, and said polymer comprising a plurality of each type of side chain,
whereby the different types of side chains are randomly or regularly distributed in the polymer.

The backbone unit A in the polymer backbone is an at least monosubstituted alkylene or arylene group, preferably it is a monosubstituted alkylene or arylene group, the only substituent being the linker group F. Most preferably backbone unit A is a monosubstituted alkylene group, such as an ethylene, propylene, butylene or pentylene group comprising as substituent the linker group F. Good results could be obtained when A is an ethylene group. Typically, the polymer backbone comprises at least 10 units A, preferably at least 50 units, most preferably at least 80 units. Generally, a longer polymer backbone comprises more side chains, which provide the desired functionalities and binding behavior and results therefore in a more stable coating of the substrate.

Group B designates an optional linker group and may be for example an amide, an ester or an ether group. Said linker group B is arranged between the backbone units A. However, preferably there is no group B present in the polymeric backbone, that is, preferably the integer n is 0. That is, each polymer unit A is connected to the adjacent polymer unit A resulting in a polymer backbone -A-A-A-A-. In case the integer n is 1, B is preferably an ether group resulting in a polyether backbone.

The polymer backbone of the polymer according to the present invention is preferably not charged. In addition, it preferably does not contain polylysine in the backbone.

Since the polymer according to the present invention is preferably obtained by post-modification of a polymer backbone carrying a reactive group, the group F links the side chain D or E to the polymer backbone. The linker group F is formed by reaction of a reactive group G on the polymer backbone with a reactive group H on the side chain D or E. Said group F is selected from the group of an ester, a secondary amine, an amide, an ether, a thio ether, a thio ester, and may be the same or different for the different types of side chains, which depends on the reactive group H of the side chain, which is intended to be reacted with the reactive group of the polymer backbone. Preferably, the linker group F is an amide.

Before carrying out the modification reaction possible reactive groups G on the polymer backbone are selected from the group consisting of esters, activated esters, chloro, fluoro, acrylate, methacrylate, NHS esters, epoxides, anhydrides, azides, alkines, and acyltrifluoroborates. The reactive group G may be connected directly to a carbon atom in the polymer backbone, or a methylene group, an ethylene group or a propylene group may be between the carbon atom of the polymer backbone and the reactive group G. Preferably, the reactive group G is connected directly to a carbon atom in the polymer backbone.

One possible backbone carrying such a reactive group is poly-(pentafluorophenylacrylate), wherein pFP stands for pentafluorophenyl and is the reactive group G and the backbone unit A is ethylene:

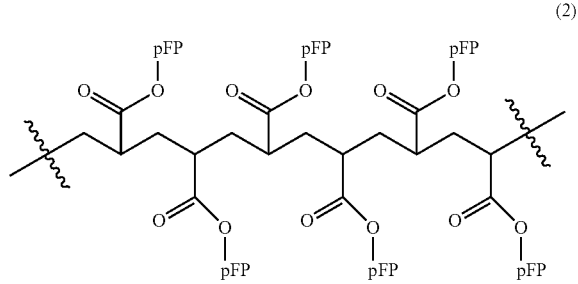

(2)

D in the functional polymer of formula (1) is a side chain, which is intended to reversible bind to a substrate and/or carries a coatings functionality. The term reversible bonding within the context of the present application stands for a weaker interaction such as van der Waals bonding, hydrogen bonding or electrostatic bonding. The term coating functionality stands for a new physicochemical property provided by the coating which does not belong to the intrinsic property of the substrate material.

Side chain D is selected from the group consisting of a short chain side chain D1 having a linear or branched, substituted or unsubstituted $C_1$ to $C_{12}$ alkyl group $R_{D1}$, which optionally comprises heteroatoms, and which carries at least one functional group K1;

a side chain D2 having a long chain $R_{D2}$ selected from the group consisting of polydimethylsiloxanes, perfluoroethers, perfluoroalkyls, polyisobutene, polyethylene glycol, polydimethylacrylamide, polyvinylpyrrolidone, polyalkyloxazolines, dextran, carboxymethyl dextran, poly(N-isopropylacrylamide), poly(N-hydroxyethylacrylamide), poly(2-hydroxyethyl methacrylate), poly-hydroxypropylmethacrylate), poly-(methacryloyloxyethyl phosphorylcholine), poly-(sulfobetaine methacrylate), poly-alkylene residues having more than 20 carbon atoms, peptide chains, DNA fragments and poly-(sulfobetaine acrylamide), whereby D2 has no functional end group or side group;

a side chain D3 having a long chain $R_{D3}$ selected from the group consisting of polydimethylsiloxanes, perfluoroethers, perfluoroalkyls, polyisobutene, polyethylene glycol, polydimethylacrylamide, polyvinylpyrrolidone, polyalkyloxazolines, dextran, carboxymethyl dextran, poly(N-isopropylacrylamide), poly(N-hydroxyethylacrylamide), poly(2-hydroxyethyl methacrylate), poly-hydroxypropylmethacrylate), poly-(methacryloyloxyethyl phosphorylcholine), poly-(sulfobetaine methacrylate), poly-alkylene residues having more than 20 carbon atoms, peptide chains, DNA fragments and poly-(sulfobetaine acrylamide) and D3 carries at least one functional end or at least one functional side group K3.

Side chain D1 is intended to reversible bind to a substrate, whereas side chains D2 and/or D3 carry a coating functionality.

The functional polymer according to the present invention may comprise different types of side chains D, for example two different types of short chain side chains D1, two types of a long chain side chain D2 and one type of long chain side chains D3. Preferably, the functional polymer according to the present invention comprises one type of side chain D1 (for example an alkyl chain comprising a terminal amine), one type of side chain D2 (for example polyethylene glycol) and optionally one type of side chain D3 (for example polyethylene glycol comprising one or more biotin units). Of course, the polymer according to the present invention comprises from each type of side chain a plurality of said side chains, which are identical.

E is a side chain, which is intended to irreversible bind to a substrate. The term irreversible bonding within the context of the present application stands for a covalent bonding between the functional group of the side chain and the substrate surface, or for a strong coordination bond between the functional group and the substrate surface. The side chain E has either a linear or branched, substituted or unsubstituted $C_1$ to $C_{20}$, preferably $C_1$ to $C_{20}$ alkyl group $R_E$, which optionally comprises heteroatoms and carries at least one functional group K4 or it is the functional group K4. In the latter case no alkyl group $R_E$ is present, that is the functional group K is bound directly to the reactive group G of the polymeric backbone forming the functional group F.

The polymer according to the present invention comprises 1 to 10 different types of side chains D and 1 to 10 different types of side chains E. The expression "type of side chain" stands for one specific side chain, which may be a side chain of class D or a side chain of class E.

However, the polymer according to the present invention must comprise one type of side chain D and at least one type of side chain E. That is, at least one type of side chain bonds irreversible to the substrate, whereas at least one type of side chain bonds reversible to the substrate and/or carries a coating functionality, which results in a loosely binding and/or in a coating functionality.

The difference between irreversible bonding and reversible bonding is not only given by the difference in bonding strength, as also the adsorption kinetics leading to a surface interaction is different between the two cases. Physiosorption, that is, the reversible bonding, is considerably faster as there is no activation barrier to overcome. Therefore, the weak-binding, in particular, the weak binding long-range interactions enable good surface spatial organization of the molecules containing ionizable groups due to intramolecular charge repulsion. This results in a higher density and controlled organization of the polymer according to the present invention due to the stretched conformation of the polymer in solution. On the other hand, the covalent binding group of the at least one other type of side chain shows a lower packing density when adsorbed onto the surface. The stability of the binding is stronger thanks the creation of a covalent or coordinative non-reversible bond. Therefore, the polymer according to the present invention is no longer highly influenced by the environmental conditions such as the pH of the solution or the ionic strength. The combination of the reversible and the irreversible bonding capabilities of the polymer according to the present invention results in a unique capability of optimal packaging and strong bonding. In addition, the polymer according to the present invention has an outstanding compatibility with a given substrate. The polymer according to the present invention comprises several chemical functionalities for both tailoring surface adhesion as well as polymer functionality dependent on its use, such as hydrophilicity, charge, wettability, lubrication, protein resistance etc. Therefore, the polymer according to the present invention can adopt spontaneously the best polymeric organization for a reproducible, enhanced and simple way to adhere on the substrates of interest, while exposing its desired functionality to the environmental interface.

The polymer according to the present invention comprises a plurality of each type of side chain. Preferably, essentially all (that is more than 90%) reactive groups of the polymer backbone result in a linker group F comprising a side chain D or E. Most preferably, the amount of linker groups F is almost equal (more than 90%) to the amounts of groups A in the backbone.

In the polymer according to the present invention the different types of side chains are randomly or regularly distributed in the polymer. Preferably, they are randomly distributed in order to have an easier synthesis and a more homogenous surface distribution.

Preferably, the polymer according to the present invention comprises a side chain D1 in which the functional group K1 is selected from the group consisting of amines, carboxy, poly (propylene sulfide) and thioethers.

Preferably, the above mentioned functional group K1 is terminal. Although it is possible that the side chain D1 comprises more than one functional group, it comprises preferably only one functional group.

Depending on the reactive group G on the polymer backbone resulting in the linker group F, the compound which is reacted with the reactive polymer backbone comprises also an additional functional group H which is intended to react with the reactive group such as an amine, an alcohol or a thiol. The functional group is preferably terminal. The following scheme shows an illustrative example of a first reaction of the polymer backbone with a side chain D1.

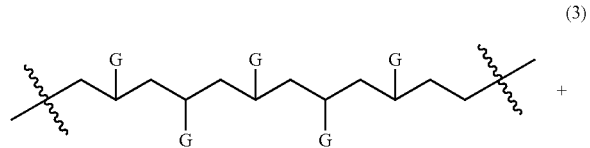

(3)

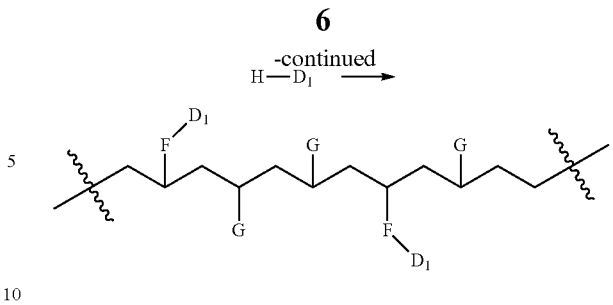

The short chain side chain D1 ($-R_{D1}-K_1$) has a linear or branched, $C_1$ to $C_{12}$ alkyl group $R_{D1}$, which optionally comprises heteroatoms in the chain and may be substituted or unsubstituted. The starting compound for the side chain D1 has the following general formula $$H-R_{D1}-K_1 \qquad (4),$$

wherein

H is the functional group, which is intended to react with the reactive group G of the polymer backbone resulting in the linker group F, $R_{D1}$ is the linear or branched $C_1$ to $C_{12}$ alkyl group, which optionally comprises heteroatoms in the chain and may be substituted or unsubstituted, and $K_1$ is a functional group, which will be defined further below.

If $R_{D1}$ is substituted it may comprise 1 to 2 methyl or ethyl groups, halogen atoms or carboxy groups. In addition, the alkyl group $R_{D1}$ may be linear or branched. Preferably, $R_{D1}$ is a linear, unsubstituted alkyl chain with 1 to 12 carbon atoms. Most preferably, $R_{D1}$ is selected from the group of methylene, ethylene, propylene, butylene, pentylene, hexylene, heptylene, octylene, nonylene, decylene, undecylene, dodecylene, $-(CH_2)-CH(COOH)-$, $-C(=O)-O-(CH_2)_n-$; and $-C(=O)-NH-(CH_2)_n-$, wherein n=1 to 8. Most preferably $R_{D1}$ is selected from the group consisting of ethylene, butylene, hexylene and undecylene.

The term amine stands for a primary amine ($R_{D1-2}-NH_2$), a secondary amine, such as $R_{D1-2}-NHCH_3$, a tertiary amine, such as $R_{D1-2}-N(CH_3)_2$ or an ammonium such as $R_{D1-2}-NH_3^+$ or $R_{D1-2}-N(CH_3)_3^+$, and $R_{D1-2}$ is preferably a linear, unsubstituted alkyl chain with 1 to 12 carbon atoms. If the functional group in D1 is an amine, D1 is preferably selected from the group of ethyleneamine, propyleneamine, butyleneamine, pentyleneamine, hexyleneamine, heptyleneamine, octyleneamine, nonyleneamine, decyleneamine, undecyleneamine and dodecyleneamine, preferably ethyleneamine, butyleneamine or hexyleneamine and most preferably hexyleneamine. Amines form in particular good electrostatic bondings to negatively charged surfaces, metal oxides, and polymers (in particular activated polymers) and weak coordinative bonds to noble metals.

The term thioether stands for thioethers of the formula $R_{D1-5}-CH_2-S-CH_3$, wherein $R_{D1-5}$ is preferably a linear $C_1$ to $C_{12}$ alkyl. If the functional group in D1 is a thioether, D1 is preferably selected from the group of methylene thioether, ethylene thioether, propylene thioether, butylene thioether, pentylene thioether, hexylene thioether, heptylene thioether, octylene thioether, nonylene thioether, decylene thioether, undecylene thioether and dodecylene thioether, preferably ethylene thioether, hexylene thioether or undecylene thioether. Thiolethers form in particular good bondings to noble metals and form van der Waals interactions with hydrophobic substrates. Within the context of the present invention thioethers are considered to bind reversible to a substrate.

The term carboxy stands for a COO⁻ residue. Due to the negative charge the carboxy group forms a weak, long range electrostatic bond on positively charged surfaces, in particular on metal oxides. If the functional group in D1 is a carboxy group ($R_{D1-5}$—COO⁻), D1 is preferably selected from the group of ethylene carbonic acid ($R_{D1-5}=C_1$), propylene carbonic acid ($R_{D1-5}=C_2$), butylene carbonic acid ($R_{D1-5}=C_3$), pentylene carbonic acid ($R_{D1-5}=C_4$), hexylene carbonic acid ($R_{D1-5}=C_5$), heptylene carbonic acid ($R_{D1-5}=C_6$) and octylene carbonic acid ($R_{D1-5}=C_7$), nonylene carbonic acid ($R_{D1-5}=C_8$), decylene carbonic acid ($R_{D1-5}=C_9$), undecylene carbonic acid ($R_{D1-5}=C_{10}$) and dodecylene carbonic acid ($R_{D1-5}=C_{11}$), preferably ethylene carbonic acid or hexylene carbonic acid.

The term poly (propylene sulfide) stands for

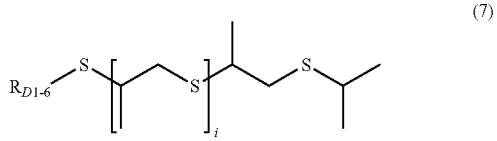

(7)

wherein i is 1 to 20 and $R_{D1-6}$ between the linker group F and the functional group is preferably linear $C_1$ to $C_{12}$ alkyl. If the functional group in D1 is a poly (propylene sulfide), D1 is preferably selected from the group of methylene poly (propylene sulfide), ethylene poly (propylene sulfide), propylene poly (propylene sulfide), butylene poly (propylene sulfide), pentylene poly (propylene sulfide), hexylene poly (propylene sulfide), heptylene poly (propylene sulfide), octylene poly (propylene sulfide), nonylene poly (propylene sulfide), decylene poly (propylene sulfide), undecylene poly (propylene sulfide) and dodecylene poly (propylene sulfide), preferably ethylene poly (propylene sulfide), hexylene poly (propylene sulfide) or undecylene poly (propylene sulfide). Poly (propylene) sulfides form in particular good weak multisite coordination bondings to noble metals.

Preferably, at least one type of side chain of the functional polymer according to the present invention is a long chain side chain D2. D2 is preferably selected from the group of polydimethylsiloxanes, perfluoroethers, perfluoroalkyls, polyisobutene, polyethylene glycol, polydimethylacrylamide, polyvinylpyrrolidone, polyalkyloxazolines, dextran, carboxymethyl dextran, poly(N-isopropylacrylamide), poly(N-hydroxyethylacrylamide, poly(2-hydroxyethyl methacrylate), poly-hydroxypropylmethacrylate), poly-(methacryloyloxylethyl phosphorylcholine), polyalkylene residues having more than 20 carbon atoms, peptide chains, DNA fragments poly-(sulfobetaine methacrylate), polyalkylene residues having more than 20 carbon atoms, peptide chains, DNA fragments and poly-(sulfobetaine acrylamide).

Typically such a "long chain" side chain D2 has a molecular weight of 500 Da to 20'000 Da, preferably from 1000 Da to 10'000 Da. Preferably, $R_{D2}$ is selected from the group consisting of polydimethylacrylamide, polyalkyloxazoline and polyethylene and most preferably polyethylene glycol. Said side chains D2 carry a coating functionality, that is they have for example non-fouling properties (in case of for example PEG, PVP and POXA) or provide other functionalities (such as hydrophobicity, oleophobicity in case of PDMS, and fluorinated polymers) to all different substrate types such as metal oxides, glass, polymers, and noble metals.

Preferably, at least one type of side chain is a long chain side chain D3 (—$R_{D3}$—$K_3$). The starting compound for the side chain D3 has the following general formula

H—$R_{D3}$—$K_3$ (6), wherein

H is the functional group, which is intended to react with the reactive group G of the polymer backbone resulting in the linker group F, and $R_{D3}$ is selected from the group consisting of polydimethylsiloxane, perfluoroethers, perfluoroalkyls, polyisobutene, polyethylene glycol, polydimethylacrylamide, polyvinylpyrrolidone, polyalkyloxazolines, dextran, carboxymethyl dextran, poly(N-isopropylacrylamide), poly(N-hydroxyethylacrylamide), poly(2-hydroxyethyl methacrylate), poly-hydroxypropylmethacrylate), poly-(methacryloyloxylethyl phosphorylcholine), poly-(sulfobetaine methacrylate), polyalkylene residues having more than 20 carbon atoms, peptide chains, DNA fragments and poly-(sulfobetaineacrylamide, and $K_3$ is the functional group, which will be defined further below. D3 comprises preferably only one functional group K3. However, it is also possible that is comprises several functional groups K3, preferably 2 to 20, most preferably 5 to 10. Preferably, D3 comprises a terminal functional group K3.

The functional group $K_3$ in the side chain D3 is preferably selected from the group consisting of biotin, nitrilotriacetic acid (NTA), amines, carboxy, fluorescence markers, antibodies, peptide and a single stranded DNA fragment.

The term amines and carboxy of the functional group $K_3$ have the same meaning as for the functional group $K_1$ of the side chain D1, but the chain $R_{D3}$ which connects the functional group to the linker group F is different from $R_{D1}$.

Said chain between the linker group F and the functional group $R_{D3}$ is said chain may be selected from the group consisting of polydimethylsiloxane, perfluoroethers, perfluoroalkyls, polyisobutene, polyethylene glycol, polydimethylacrylamide, polyvinylpyrrolidone, polyalkyloxazolines, dextran, carboxymethyl dextran, poly(N-isopropylacrylamide), poly(N-hydroxyethylacrylamide, poly(2-hydroxyethyl methacrylate), poly-hydroxypropylmethacrylate), poly-(methacryloyloxylethyl phosphorylcholine), polyalkylene residues having more than 20 carbon atoms, peptide chains, DNA fragments, poly-(sulfobetaine methacrylate), and poly-(sulfobetaineacrylamide, preferably polydimethylacrylamide, polyalkyloxazoline and polyethylene glycol, and most preferably polyethylene glycol.

Typically said chain $R_{D3}$ has a molecular weight of 500 Da to 30'000 Da, preferably from 5000 Da to 15'000 Da, resulting in a long chain side chain D3.

Most preferably, $R_{D3}$ is a polyethylene glycol oligomer having 5 to 230, preferably 20 to 120 ethylene glycol units.

The term fluorescence marker stands for a fluorophore that provides a visual functionality to the polymer. Examples are xanthene, cyanine, naphthalene, coumarines, oxadiazole, anthracene, pyrene, oxazine, acridine, arylmethine, tetrapyrrole, benzofuranes, perylenes, benzanthrones, anthrapyrimidines or anthrapyridones. Side chains D3 comprising a fluorescence marker as functional group K3 have all outstanding fluorescent properties and are suitable for all different substrate types such as metal oxides, glass, polymers, and noble metals.

If the functional group $K_3$ of side chain D3 is an antibody, it may be one of the antibodies known to the skilled persons.

If the functional group $K_3$ of side chain D3 is a peptide, it may be a custom synthesized peptide or a one of the known cell selective peptide sequences. Most preferred is a peptide sequence containing the RGD segment.

If the functional group $K_3$ of side chain D3 is biotin of the formula 5

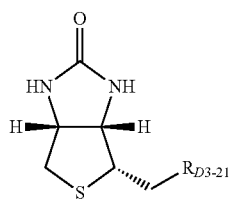
(5)

$R_{D3\text{-}21}$ is a long chain as defined above, most preferably it is polyethylene glycol.

If the functional group $K_3$ of the side chain D3 is nitrilotriacetic acid

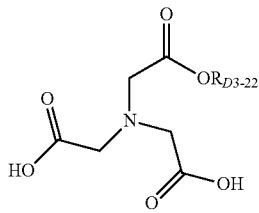

$R_{D3\text{-}22}$ is a long chain as defined above, preferably polyethylene glycol.

Alternatively, the side chain D3 may be a peptide or a single stranded DNA fragment, which is linked to the polymer backbone by the linker group F.

The functional polymer according to the present invention must comprise at least one type of side chain E. The starting compound for the side chain E has the following general formula

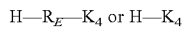
H—$R_E$—$K_4$ or H—$K_4$ depending on whether there is an alkyl chain present between the functional group K4 and the functional group H. In said formulas H is the functional group, which is intended to react with the reactive group G of the polymer backbone resulting in the linker group F, $R_E$ is the linear or branched $C_1$ to $C_{20}$, preferably $C_1$ to $C_{12}$ alkyl group $R_E$, which optionally comprises heteroatoms in the chain and may be substituted or unsubstituted, and $K_4$ is a functional group, which will be defined further below.

The functional group $K_4$ of the side chain E is intended to irreversible bind to a substrate. It is preferably selected from the group of alkoxy silanes, chloro silanes, catechols, phosphates, phosphonates, mimosine derivatives, anacheline, gallols, thiols, N-heterocyclic carbenes, perfluorophenyl azides, benozophenon, diaryldiazomethane, aryltrifluoromethyldiazomethane, and organoboron.

Preferably, the above mentioned functional group K3 is terminal. Although it is possible that the side chain E comprises more than one functional group, it comprises preferably only one functional group.

In the side chain E $R_E$ is preferably selected from the group consisting of methylene, ethylene, propylene, butylene, pentylene, hexylene, heptylene, octylene, nonylene, decylene, undecylene, dodecylene, —(CH$_2$)—CH(COOH)—, —C(=O)—O—(CH$_2$)$_n$—; and —C(=O)—NH—(CH$_2$)$_n$—, wherein n=1 to 8. Most preferably $R_E$ is selected from the group consisting of methylene, ethylene, propylene, butylene, —(CH$_2$)—CH(COOH)—, —C(=O)—O—(CH$_2$)$_n$—; and —C(=O)—NH—(CH$_2$)$_n$—, wherein n=1 to 8.

If the functional group in side chain E is an alkoxy silane of the formula

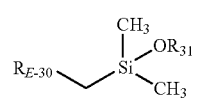
(8)

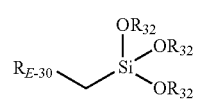
(9)

$R_{E\text{-}30}$ is a linear or branched, saturated or unsaturated alkyl chain connecting the linker group F and the alkoxy silane group. Preferably, $R_{E\text{-}30}$ is selected from the group consisting of methylene, ethylene, propylene, and butylene. The silane group is preferably terminal. $R_{31}$ and $R_{32}$ are selected from the group of methyl, ethyl, propyl or isopropyl, preferably methyl or ethyl and most preferably ethyl. Most preferably side chain E is propyldimethylethoxysilane or propyldimethyldimethylmethoxysilane, which is preferably linked by an amine to the linker group F resulting for example in an amide. Alkoxysilanes form in particular good bondings to hydroxyl groups on surfaces, metal oxides, glass, and polymers (in particular activated polymers).

If the functional group in side chain E is a chloro silane cAG formula

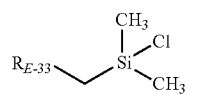
(10)

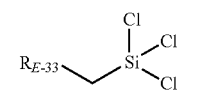
(11)

$R_{E\text{-}33}$ is a linear or branched, saturated or unsaturated alkyl chain connecting the linker group F and the chloro silane group. Preferably $R_{E\text{-}33}$ is selected from methylene, ethylene, propylene, and butylene. The chloro silane group is preferably terminal. Most preferably side chain E is propyldimethyldimethylchlorosilane or propyltrichlorosilane which are preferably linked by an amine to the linker group F resulting for example in an amide. Chlorosilanes form in particular good bondings to hydroxyl groups on surfaces, metal oxides, glass, polymers (in particular activated polymers).

In the functional group in E is a catechol of the formula 12

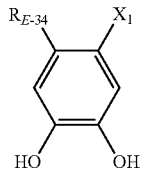

wherein $X_1$ is H, F, Cl, Br, I, $CF_3$, acetyl, nitro, $CH_3$, —$N(CH_3)_2$, $N(CH_3)_3^+$, $SO_3^-$, or $SO_2CF_3$, $R_{E\text{-}34}$ is preferably selected from the group of consisting of methylene, ethylene, propylene, butylene, pentylene, hexylene, heptylene, octylene, nonylene, decylene, undecylene and dodecylene, as well as —$(CH_2)$—$CH(COOH$—$)$, —$C(\!\!=\!\!O)$—$O$—$(CH_2)_{n=1\text{-}8}$; and —$C(\!\!=\!\!O)$—$NH$—$(CH_2)_{n=1\text{-}8}$—. Depending on the nature of the substrate catecholes have the ability to bind either covalent via condensation reaction or bycoordination.

Each combination of $R_{E\text{-}34}$ and $X_1$ is part of the present invention as shown in tables A1 and A2 and represents a specific type of side chain E:

TABLE A1

| | $R_{E\text{-}34}$ | | | | | | | |
|---|---|---|---|---|---|---|---|---|
| $X_1$ | —$(CH_2)$ | —$(CH_2)_2$ | —$(CH_2)_3$ | —$(CH_2)_4$ | —$(CH_2)_5$ | —$(CH_2)_6$ | —$(CH_2)_7$ | —$(CH_2)_8$ |
| H | + | + | + | + | + | + | + | + |
| F | + | + | + | + | + | + | + | + |
| Cl | + | + | + | + | + | + | + | + |
| Br | + | + | + | + | + | + | + | + |
| I | + | + | + | + | + | + | + | + |
| $CF_3$, | + | + | + | + | + | + | + | + |
| acetyl | + | + | + | + | + | + | + | + |
| $NO_2$ | + | + | + | + | + | + | + | + |
| $CH_3$ | + | + | + | + | + | + | + | + |
| $N(CH_3)_2$ | + | + | + | + | + | + | + | + |
| $N(CH_3)_3^+$ | + | + | + | + | + | + | + | + |
| $SO_3^-$ | + | + | + | + | + | + | + | + |
| $SO_2CF_3$ | + | + | + | + | + | + | + | + |

TABLE A2

| | $R_{E\text{-}34}$ | | | | | |
|---|---|---|---|---|---|---|
| $X_1$ | —$(CH_2)_9$ | —$(CH_2)_{10}$ | —$(CH_2)_{11}$ | —$(CH_2)_{12}$ | —$(CH_2)$—$CH(COOH$—$)$ | —$(CH_2)CH(COOH)$— |
| H | + | + | + | + | + | + |
| F | + | + | + | + | + | + |
| Cl | + | + | + | + | + | + |
| Br | + | + | + | + | + | + |
| I | + | + | + | + | + | + |
| $CF_3$, | + | + | + | + | + | + |
| acetyl | + | + | + | + | + | + |
| $NO_2$ | + | + | + | + | + | + |
| $CH_3$ | + | + | + | + | + | + |
| $N(CH_3)_2$ | + | + | + | + | + | + |
| $N(CH_3)_3^+$ | + | + | + | + | + | + |
| $SO_3^-$ | + | + | + | + | + | + |
| $SO_2CF_3$ | + | + | + | + | + | + |

| | $R_{E\text{-}34}$ | |
|---|---|---|
| $X_1$ | —$C(\!\!=\!\!O)$—$O$—$(CH_2)_{n=1\text{-}8}$— | —$C(\!\!=\!\!O)$—$NH$—$(CH_2)_{n=1\text{-}8}$— |
| H | + | + |
| F | + | + |
| Cl | + | + |
| Br | + | + |
| I | + | + |
| $CF_3$, | + | + |
| acetyl | + | + |
| $NO_2$ | + | + |
| $CH_3$ | + | + |
| $N(CH_3)_2$ | + | + |
| $N(CH_3)_3^+$ | + | + |
| $SO_3^-$ | + | + |
| $SO_2CF_3$ | + | + |

Most preferably $X_1$ is hydrogen or nitro and $R_{E-34}$ is ethylene, since this allows to use as starting compound nitrodopamine or dopamine. Catechols form in particular good bondings to metal oxides, especially transition metal oxides, and to metal surfaces (such as Ag, Au and Pt).

If the functional group in side chain E is a mimosine derivative of the formula 13 or 14

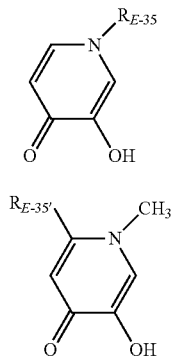

(13)

(14)

$R_{E-35}$ and/or $R_{E-35'}$ are preferably selected from the group of a substituted or unsubstituted methylene, ethylene, propylene, butylene, pentylene, hexylene, heptylene and octylene, most preferably a carboxy substituted ethylene, which has the advantage that the amino acid minosine

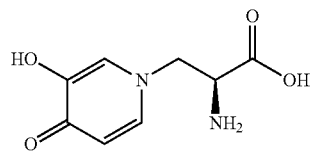

(14a)

can be used as starting compound and linked to the linker group G by the amine group. Mimosine derivatives form in particular strong covalent or coordinative bonds to oxide surfaces, especially transition metal oxides, and to metal surfaces (such as Ag, Au and Pt).

If the functional group in E is anacheline of the formula

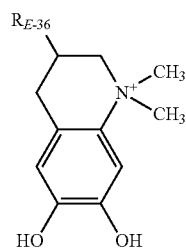

(15)

$R_{E-36}$ is preferably a linear or branched, saturated or unsaturated alkyl chain having 1 to 8 carbon atoms connecting the linker group F and the anacheline group, the side chain E is preferably selected from the group of ethyl anacheline ($R_{E-36}=(CH_2)_2$), propyl anacheline ($R_{E-36}=(CH_2)_3$), butyl anacheline ($R_{E-36}=(CH_2)_4$), pentyl anacheline ($R_{E-36}=(CH_2)_5$), hexyl anacheline ($R_{E-36}=(CH_2)_6$), heptyl anacheline ($R_{E-36}=(CH_2)_7$) and octyl anacheline ($R_{E-36}=(CH_2)_8$. Alternatively, $R_{E-36}$ may be replaced by an amino group. Most preferably anacheline is coupled to the functional group G by its amino group. Anacheline forms in particular strong covalent or coordinative bonds to oxide surfaces, especially transition metal oxides and to metal surfaces such as (Ag, Au and Pt).

The term gallol stands for

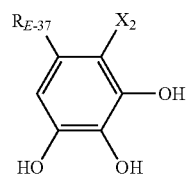

(16)

wherein $X_2$ is H, F, Cl, Br, I, $CF_3$, acetyl, nitro, $CH_3$, $-N(CH_3)_2$, $N(CH_3)_3^+$, $SO_3^-$, or $SO_2CF_3$ and $R_{E-37}$ is selected from the group of methylene, ethylene, propylene, butylene, pentylene, hexylene, heptylene, octylene nonylene, decylene, undecylene and dodecylene, as well as $-(CH_2)-CH(COOH-)$, $-C(=O)-O-(CH_2)_{n=1-8}-$; and $-C(=O)-NH-(CH_2)_{n=1-8}-$. Each combination of $R_{E-37}$ and $X_2$ is part of the present invention as shown in tables B1 and B2 and represents a specific type of side chain E:

TABLE B1

| | $R_{E-37}$ | | | | | | | |
|---|---|---|---|---|---|---|---|---|
| $X_2$ | —(CH) | —(CH)$_2$ | —(CH)$_3$ | —(CH)$_4$ | —(CH)$_5$ | —(CH)$_6$ | —(CH)$_7$ | —(CH)$_8$ |
| H | + | + | + | + | + | + | + | + |
| F | + | + | + | + | + | + | + | + |
| Cl | + | + | + | + | + | + | + | + |
| Br | + | + | + | + | + | + | + | + |
| I | + | + | + | + | + | + | + | + |
| $CF_3$ | + | + | + | + | + | + | + | + |
| acetyl | + | + | + | + | + | + | + | + |
| $NO_2$ | + | + | + | + | + | + | + | + |
| $CH_3$ | + | + | + | + | + | + | + | + |
| $N(CH_3)_2$ | + | + | + | + | + | + | + | + |
| $N(CH_3)_3^+$ | + | + | + | + | + | + | + | + |
| $SO_3^-$ | + | + | + | + | + | + | + | + |
| $SO_2CF_3$ | + | + | + | + | + | + | + | + |

TABLE B2

| X$_2$ | $R_{E-37}$ | | | | | |
|---|---|---|---|---|---|---|
| | —(CH$_2$)$_9$ | —(CH$_2$)$_{10}$ | —(CH$_2$)$_{11}$ | —(CH$_2$)$_{12}$ | —(CH$_2$)—CH(COOH—) | —C(=O)—O—(CH$_2$)$_{n=1-8}$— |
| H | + | + | + | + | + | + |
| F | + | + | + | + | + | + |
| Cl | + | + | + | + | + | + |
| Br | + | + | + | + | + | + |
| I | + | + | + | + | + | + |
| CF$_3$, | + | + | + | + | + | + |
| acetyl | + | + | + | + | + | + |
| NO$_2$ | + | + | + | + | + | + |
| CH$_3$ | + | + | + | + | + | + |
| N(CH$_3$)$_2$ | + | + | + | + | + | + |
| N(CH$_3$)$_3$$^+$ | + | + | + | + | + | + |
| SO$_3$$^-$ | + | + | + | + | + | + |
| SO$_2$CF$_3$ | + | + | + | + | + | + |

| X$_2$ | $R_{E-37}$ —C(=O)—NH—(CH$_2$)$_{n=1-8}$— |
|---|---|
| H | + |
| F | + |
| Cl | + |
| Br | + |
| I | + |
| CF$_3$, | + |
| acetyl | + |
| NO$_2$ | + |
| CH$_3$ | + |
| N(CH$_3$)$_2$ | + |
| N(CH$_3$)$_3$$^+$ | + |
| SO$_3$$^-$ | + |
| SO$_2$CF$_3$ | + |

Most preferably X$_2$ is hydrogen and $R_{E-37}$ is —(CH$_2$)—CH(COOH—), —C(=O)—O—(CH$_2$)$_{n=1-8}$—; and —C(=O)—NH—(CH$_2$)$_{n=1-8}$—. Gallols form in particular strong covalent or coordinative bonds to oxide surfaces.

The term thiols stands for $R_{E-38}$—SH. If the functional group K4 is a thiol, $R_{E-38}$ is preferably selected from the group of consisting of methylene, ethylene, propylene, butylene, pentylene, hexylene, heptylene, octylene, nonylene, decylene, undecylene, dodecylene, —(CH$_2$)—CH(COOH—), —C(=O)—O— (CH$_2$)$_{n=1-8}$—; and —C(=O)—NH— (CH$_2$)$_{n=1-8}$—. Most preferred are ethylene, hexylene and undecylene. Thiols form in particular strong covalent bonds to nobel metals such as Ag, Au and Pt.

If the functional group in E is an N-heterocyclic carbene of the formula

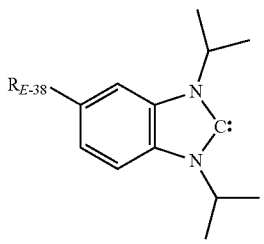

(17)

wherein $R_{E-38}$ is a linear or branched, saturated or unsaturated, substituted or non-substituted alkyl chain having 1 to 8 carbon atoms connecting the linker group F and the N-heterocyclic carbene. $R_{E-38}$ is preferably methylene, eth-ylene, —(CH$_2$) CH(COOH)—; —O— (CH$_2$)$_{x=1-8}$—; —C(=O)—O— (CH$_2$)$_{n=1-8}$-; —C(=O)—O— (CH$_2$)$_{n=1-8}$ and —C(=O)—NH— (CH$_2$)$_{n=1-8}$-. N-heterocyclic carbenes form in particular strong covalent bondings to noble metal surfaces (such as Au).

The term perfluorophenylazide stands for

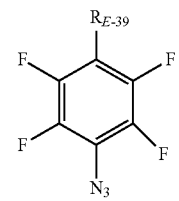

(18)

wherein $R_{E-39}$ is preferably a linear or branched, saturated or unsaturated alkyl chain having 1 to 8 carbon atoms. If the functional group of side chain E is a perfluorophenylazide it is preferably selected from the group of ethyl perfluoroazid, propyl perfluoroazid, butyl perfluoroazid, pentyl perfluoroazid, hexyl perfluoroazid, heptyl perfluoroazid and octyl perfluoroazid or $R_{E-39}$ is —(CH$_2$) CH(COOH)—; —O— (CH$_2$)$_{n=1-8}$—; —C(=O)—O— (CH$_2$)$_{n=1-8}$—; —C(=O)— NH— (CH$_2$)$_{n=1-8}$-Azides upon activation with light or temperature form via an intermediate nitrene in particular good covalent insertions into bonds of polymers and coordination bondings to metals.

If the functional group in side chain E is benzophenone of the formula 19

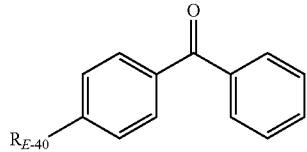
(19)

$R_{E-40}$ is a linear or branched, saturated or unsaturated, substituted or unsubstituted alkyl chain having 1 to 8 carbon atoms, preferably, methylene, ethylene, —(CH$_2$) CH(COOH)—; —O— (CH$_2$)$_{n=1-8}$—; —C(=O)—O— (CH$_2$)$_{n=1-8}$—; and —C(=O)—NH—(CH$_2$)$_{n=1-8}$—. The presence of benzophenone as functional group allows a covalent insertion into bonds of polymers after activation (via diradical). Therefore, said functional group is especially preferred for polymer substrates.

If the functional group in side chain E is diaryldiazomethane of the formula 20

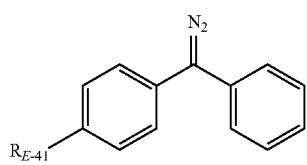
(20)

$R_{E-41}$ is preferably a linear or branched, saturated or unsaturated alkyl chain having 1 to 8 carbon atoms and most preferably, methylene, ethylene, —(CH$_2$) CH(COOH)—; —O— (CH$_2$)$_{n=1-8}$—; —C(=O)—O— (CH$_2$)$_{n=1-8}$—; and —C(=O)—NH—(CH$_2$)$_{n=1-8}$—. The presence of diaryldiazomethane as functional group allows a covalent insertion into bonds of polymers after activation (via carbene). Therefore, said functional group is especially preferred for polymer substrates.

If the functional group in side chain E is aryltrifluoromethyldiazomethane of the formula 21

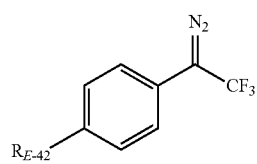
(21)

$R_{E-42}$ is a linear or branched, saturated or unsaturated alkyl chain having 1 to 8 carbon atoms and most preferably, methylene, ethylene, —(CH$_2$) CH(COOH)—; —O— (CH$_2$)$_{n=1-8}$-; —C(=O)—O— (CH$_2$)$_{n=1-8}$-; and —C(=O)— NH—(CH$_2$)$_{n=1-8}$—. The presence of diaryldiazomethane as functional group allows a covalent insertion into bonds of polymers after activation (via carbene). Therefore, said functional group is especially preferred for polymer substrates.

The term organoboron stands for

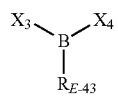
(22)

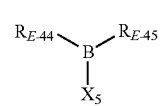
(23)

wherein $X_3$, $X_4$, and $X_5$ are independently from each other Cl or OH, $R_{E-44}$ is methyl or ethyl, and $R_{E-43}$ and $R_{E-45}$ are a linear or branched, saturated or unsaturated alkyl chains having 1 to 8 carbon atoms. Organoboron forms in particular strong covalent bondings to polymers and oxide surfaces.

The term phosphates stands for a monophosphate $R_{E46}O—PO_3^{2-}$, wherein $R_{E46}$ is preferably a linear unsubstituted $C_1$ to $C_{12}$ alkyl group. If the functional group in E is a phosphate, E is preferably selected from the group of ethylene phosphate, propylene phosphate, butylene phosphate, pentylene phosphate, hexylene phosphate, heptylene phosphate, octylene phosphate, nonylene phosphate, decylene phosphate, undecylene phosphate and dodecylene phosphate, preferably hexylene phosphate and dodecylene phosphate. Phosphates form in particular good long range electrostatic bondings to positive charged metal oxides and form coordinative bonds to negative charged metal oxides. Within the context of the present invention phosphates are considered to irreversible bind to a substrate.

The term phosphonates stands for phosphonates of the formula $R_{E-47}—CH_2—PO_3^{2-}$, wherein $R_{E-47}$ is preferably a linear $C_1$ to $C_8$ alkyl. If the functional group in E is a phosphonate, E is preferably selected from the group of ethylene phosphonate, propylene phosphonate, butylene phosphonate, pentylene phosphonate, hexylene phosphonate, heptylene phosphonate octylene phosphonate, nonylene phosphonate, decylene phosphonate, undecylene phosphonate and dodecylene phosphonate, preferably hexylene phosphonate and dodecylene phosphonate. Phosphonates form in particular good long range electrostatic bondings to positive charged metal oxides and form coordinative bonds to negative charged metal oxides. Within the context of the present invention phosphonates are considered to irreversible bind to a substrate.

In a preferred embodiment the functional polymer according to the present invention comprises 2 to 8 different types of side chains D and 1 to 5 different types of side chains E. The 2 to 8 different types of side chains may be different types of side chains D1, different types of side chains D2, different types of side chains D3, a combination of side chains D1 and D2, a combination of side chains D1 and D3, a combination of side chains D2 and D3 as well as a combination of side chains D1, D2 and D3. Most preferably the functional polymer comprises 2 to 5 different types side chains D and 1 or 2 different types side chains E.

In a preferred embodiment of the present invention the functional polymer according comprises at least 1 type side chain D1 and at least 1 type of side chain E, and preferably additionally at least 1 type of side chain D2 and/or at least 1 type of side chain D3.

Preferably, the functional polymer comprises
(i) 1 or 2 different types of side chains D1 comprising functional group K1 selected from the group consisting of amines, carboxy, poly (propylene sulfid) and thioether, preferably amines or carboxy, most preferably amines and, (ii) preferably 1 or 2, preferably 1, different types of side chains D2 selected from the group of polyethylene glycol, polydimethylacrylamide and polyalkyloxaoline, and
(iii) 1 to 3 different, preferably 2 or 3, most preferably 3, different types side chains E comprising a functional group K4 from the group consisting of alkoxy silanes, chloro silanes, catechols, phosphates, phosphonates or thiols, preferably of alkoxy silanes, phosphates and catechols,
(iv) and optionally 1 or 2, preferably 1, different type of side chains D3 comprising a functional group K3 selected from the group consisting of biotin and NTA.

Preferably, the functional polymer comprises
(i) a hexyl-amine as side chain D1,
(ii) amine PEG (preferably 2 kDa) as side chain D2,
(iii) amino propyldimethyl ethoxy silane and nitrodopanine as side chains E (two types of side chains),
(iv) and optionally amine PEG (preferably 3.5 kDa) biotin or amine PEG (preferably 3.4 kDa) NTA as side chain D3.

A preferred polymer of the present invention is a polymer of the following formula, The preparation of a polymer according to the present invention comprising 5 different types of side chains can follow the following procedure:
1) Preparation of the polymer backbone comprising the reactive groups G, preferably by using a radical polymerization protocol,
2) reacting a first side chain D3 comprising a reactive group H with the polymer backbone resulting in a linker group F,
3) reacting a second side chain D2 comprising a reactive group H with the polymer backbone resulting in a linker group F,
4) reacting a third side chain D1 comprising a reactive group H with the polymer backbone resulting in a linker group F,
5) reacting a forth side chain E comprising a reactive group H with the polymer backbone resulting in a linker group F,
6) reacting a fifth side chain E comprising a reactive group H with the polymer backbone resulting in a linker group F.

If necessary, the functional groups K1, K3 or K4 have to be protected. The addition of the different types of side

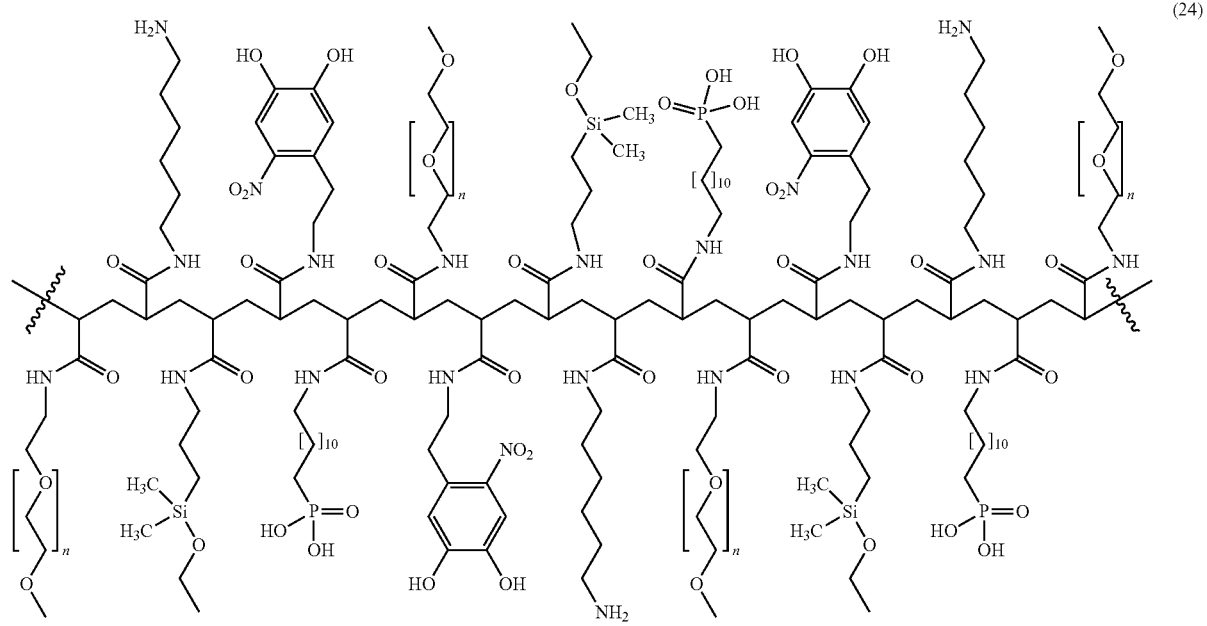

(24)

wherein the five different types of side chains may be regularly or randomly distributed (in formula 24 n is 5 to 230, preferably 20 to 120).

Preferably, the polymer according to the present invention is obtained by a fast and versatile post-modification of the polymer backbone. Post-modifications of polymers are known in the art such as in Klok et al, Systhesis of functional polymers by post-polymerization modification, Angew. Chem. In. Ed. 2009, 48, 48 to 58.

Before carrying out the modification reaction the polymer backbone comprises preferably reactive groups selected from the group of esters, activated esters, NHS esters, epoxides, anhydrides, azides, alkines, acyltrifluoroborates. Most preferably the reactive groups are activated esters, obtained by using a radical polymerisation method. This can be a free radical polymerisation or a controlled radical polymerisation.

chains can occur sequentially or in parallel, preferably sequentially. Preferably, the bulky side chains D2 and/or D3 are added to the polymer backbone first, and subsequently the shorter chains D1 and/or E are added.

In a preferred embodiment of the present invention the polymer backbone before carrying out the modification reactions is a pentafluorophenol ester or a pentachlorophenol ester, preferably a poly(pentafluorophenol acrylate), poly (pentafluorophenol methacrylate), poly(pentachlorophenol acrylate), poly(pentachlorophenol methacrylate), and most preferably a poly(pentafluorophenol acrylate).

The functional polymer according to the present invention can preferably be deposited on the substrate by dip coating, spin coating, spraying, printing, coating or solvent casting. In all cases, the solution containing the functional polymer gets preferably in contact with the substrate to be modified so that the moieties can graft chemically onto the surface. The obtained coating is depending of the architecture of the molecules used and can vary from a monomolecular thick layer having a thickness of 0.1 to 10 nanometers, preferably 1 to 3 nanometers, to a multilayered system with a thickness of 10 nanometer to 10 micrometers, preferably 10 to 50 nanometers.

The functional polymers according to the present invention are preferably for coating systems on different substrate, in particular on metal oxides, such as silicon dioxide or transition metal oxides, preferably $TiO_2$, $Nb_2O_5$, $Ta_2O_5$, $Fe_2O_3$, $Fe_3O_4$, on noble metal surfaces, such as gold, silver and platinum, and polymers such as polyethylene.

The functional polymer according to the present invention can be used as multi-functional coatings or it can have a very specific coating function, that is it can be for example an anti-fouling coating. A substrate in the context of the present invention may be a surface, in particular a two-dimensional surface, as well as nanoparticles or microparticles, which are to be partly or fully covered with the functional polymer according to the present invention.

For a metal oxide substrate, in particular a silicon dioxide or titanium dioxide, the polymer according to the present invention comprises preferably
- at least one type of side chain is a side chain D1, wherein the functional group is preferably selected from amines, carboxy, and/or
- at least one type of side chain is a side chain D2,
- at least one type of side chain is a side chain E, wherein the functional group is preferably selected from the group consisting of catechols, mimosine derivatives, anacheline, gallols and organoboron.

In addition, it can optionally comprise at least one type of side chain D3, wherein the functional group is preferably selected from the group consisting of amines, carboxy and biotin.

For a substrate with a noble metal surface, in particular silver or gold surface, the functional polymer according to the present invention comprises preferably
- at least one type of side chain is a side chain D1, wherein the functional group is selected from the group consisting of amine, thioether and poly(propylene sulfide),
- at least one type of side chain is a side chain D2 having no functional group, and
- at least one type of side chain is a side chain E, wherein the functional group is preferably selected from the group consisting of catechol, thiols, and N-heterocyclic carbenes.

In addition, it can optionally comprise at least one type of side chain D3, wherein the functional group is preferably consisting of amines, carboxy and biotin.

For a polymer substrate, in particular for polyethylene, the functional polymer according to the present invention comprises preferably
- at least one type of side chain is a side chain D1, wherein the functional group is selected from the group consisting of amine and carboxy,
- at least one type of side chain is a side chain D2 having no functional group, and
- at least one type of side chain is a side chain E, wherein the functional group is preferably selected from the group consisting of alkoxysilane, chlorosilane, perfluoroazide, benzophenone, diaryldiazomethane, aryltrifluoromethyldiaomethan, and organoboron.

In addition, it can optionally comprise at least one type of side chain D3 wherein the functional group is preferably consisting of amines, carboxy and biotin.

EXPERIMENTAL PART

Example 1: Synthesis of Polypentafluorophenyl Acrylate (PPFPAc)

The monomer pentafluorophenyl acrylate (PFPAc) is a well-known commercially available product and was prepared according to the previously reported protocol (Eberhardt, M., & Theato, P. (2005). RAFT polymerization of PFPAc: preparation of reactive linear diblock copolymers. *Macromolecular Rapid Communications*, 26(18), 1488-1493). Briefly, pentafluorophenol (87.21 g, 0.47 mol) was dissolved in 150 mL of $CH_2Cl_2$ at 0° C. and 2,6-dimethylpyridine (60.55 mL, 0.52 mol) was added slowly through a dropping funnel, which was afterwards rinsed with another 150 mL of $CH_2Cl_2$ also added to the reaction mixture. Acryloyl chloride (42.14 mL, 0.52 mol) was then added dropwise to the reactor, still under cooling, and left to react for 18 h under N2 atmosphere while warming up to room temperature. The resulting 2,6-dimethylpyridine hydrochloride salt was removed by filtration and the subsequent solution was washed three times with 100 mL of water, dried with $MgSO_4$ and the solvent evaporated under reduced pressure. The product was purified twice by vacuum distillation to obtain the pure monomer as a colorless liquid (97.09 g, 78%).

$^1$H NMR ($CDCl_3$ δ/ppm): 3.1 ppm (1H, a) and 2.1 ppm (2H, br s).

The monomer PFPAc (14.31 g, 60.13 mmol), the initiator AIBN (23.83 mg, 0.15 mmol) and the chain transfer agent 2-(Dodecylthiocarbonothioylthio)-2-methylpropionic acid (158.45 mg, 0.43 mmol) were dissolved in 15 mL of toluene inside a Schlenk-tube. The solution was degassed via three freeze-pump-thaw cycles and left to react under nitrogen atmosphere at 80° C. in an oil bath for 18 h. The reaction mixture was left to cool down to room temperature and the resulting polymer (PPFPAc) was isolated by precipitation in methanol and dried under vacuum for 48 h (Yield: 12.90 g, 90%).

GPC (THF): $M_n$=12800 g mol$^{-1}$, $M_w$=19300 g mol$^{-1}$, PDI=1.51.

FTIR (KBr, cm$^{-1}$); 2950 (C—H stretch), 1800 (C=O stretch), 1525 (aromatic C—C), 950-1250 (C—F stretch).

$^1$H NMR ($CDCl_3$, δ/ppm):—CH— 3.1 (1H, br, s), —$CH_2$— 2.15 (2H, br, s).

Anal. Calcd. for $(C_8H_3F_5)_n$: C 45.37, H 1.26, O 13.45, F 39.92. Found: C 45.40, H 1.27, O 13.44, F 39.89.

Example 2: First Stage Postmodification of PPFPAc: PEGylation for Non-Fouling Functionality In order to obtain non-fouling properties, the backbone from Example 1 was modified with the polymer methoxypoly (ethylene glycol)-amine hydrochloride (PEG-NH2 HCl, 2000 g mol$^{-1}$). Briefly, 79.4 mg (0.333 mmol per monomer) of PPFPAc was dissolved in dimethylformamide (DMF) under stirring at a temperature of 50° C. Separately, 100 mg of PEG-NH2 HCl was dissolved in DMF (0.050 mmol) together with a 2 to 3-fold excess of triethylamine. The PEG solution was then added to the initial reactive mixture drop-wise and left to react overnight to obtain a PEG grafting density of 0.15. The resulting solution of poly(acrylic acid)-g-(PFPAc, PEG) (238.11:2000 Mr; 0.85: 0.15 d), was used for further postmodification as described in the following section.

¹H NMR (CDCl₃, δ/ppm): —CH₂—O—CH₂— 3.5-3.8 (180H, m), —O—CH₃ 3.4 (3H, s), —CH₂—NH—C(=O)— 3.1 (2H, m).

Example 3: Second Stage Postmodification of PPFPAc: Binding Side Groups

All polymer combinations presented below started from the pegylated version of poly(acrylic acid)-g-(PFPAc, PEG) (238.11:2000 Mr; 0.85:0.15 d) described in Example 2.

Polymer A poly(acrylic acid)-g-(PEG, 1,6-hexanediamine) (2000:116.2 Mr; 0.15:0.85 d): 107.43 mg (0.425 mmol) of N-Boc-1,6-hexanediamine hydrochloride was dissolved in 1 mL of DMF with an excess of triethylamine (177.71 µL, 1.275 mmol). The mixture was added drop-wise to the poly(acrylic acid)-g-(PFPAc, PEG) (238.11:2000 Mr; 0.85:0.15 d) solution prepared as in example 2 and left to react overnight under stirring at 50° C. DMF was evaporated under reduced pressure, the mixture re-dissolved in dichloromethane (DCM, 2 mL, 4 equivalents) and trifluoroacetic acid (0.5 mL, 1 equivalent) and left to react under stirring overnight. The resulting mixture was again evaporated under reduced pressure and re-dissolved in ultrapure water (5 mL). This solution was purified by dialysis against water for two days using a membrane with a MWCO of 3,500 Da and subsequently freeze dried to obtain the polymer as a white powder (yield: 133.77 mg, 77.24%).

Polymer B poly(acrylic acid)-g-(PEG, 1,6-hexanediamine, 3-aminopropyldimethylethoxysilane) (2000:116.2:161.3 Mr; 0.15:0.425:0.425 d): 35.81 mg (0.142 mmol) of N-Boc-1,6-hexanediamine hydrochloride was dissolved in 1 mL of DMF with an excess of triethylamine (59.2 uL, 0.425 mmol). The mixture was added drop-wise to the Poly(acrylic acid)-g-(PFPAc, PEG) (238.11:2000 Mr; 0.85:0.15 d) solution from example 2 and left to react overnight under stirring at 50° C. A new solution containing 45.71 mg (0.283 mmol) of 3-aminopropyldimethylethoxysilane and triethylamine (118.47 µL, 0.85 mmol) in 1 mL of DMF was added drop-wise to the previous solution still at 50° C. and under stirring overnight. Deprotection of the amine and purification followed as described for polymer A.

Polymer C poly(acrylic acid)-g-(PEG, 1,6-hexanediamine, nitrodopamine) (2000: 116.2:198.2 Mr; 0.15:0.425: 0.425 d): postmodification with N-Boc-1,6-hexanediamine hydrochloride was as described in polymer B. An excess of nitrodopamine was dissolved separately (83.94 mg, 0.283 mmol) in 1 mL of DMF with 118.47 µL of triethylamine (0.85 mmol). The latter solution was added slowly to the hexanediamine solution and left stirring overnight at the same temperature. Deprotection of the amine and purification followed as described for polymer A.

Polymer D poly(acrylic acid)-g-(PEG, 1,6-hexanediamine, 12-aminododecylphosphonate) (2000:116.2:265.3 Mr; 0.15:0.425:0.425 d): postmodification with N-Boc-1,6-hexanediamine hydrochloride was as described in polymer B. To this a solution containing 12-aminododecylphosphonate-bistrimethylsilylester and 118.47 µL of triethylamine (0.85 mmol) in 1 mL of DMF (85.33 mg, 0.283 mmol) was added drop-wise. The resulting polymer solution was left reacting overnight at 50° C. while stirring, followed by the deprotection of the amine and phosphonate and purification as described for polymer A.

Polymer E poly(acrylic acid)-g-(PEG, 1,6-hexanediamine, ethanolamine) (2000: 116.2:61.1 Mr; 0.15:0.425: 0.425 d): postmodification with N-Boc-1,6-hexanediamine hydrochloride was as described in polymer B, after which an excess containing solution of ethanolamine (17.31 mg, 0.283 mmol) and triethylamine (118.47 µL, 0.85 mmol) in 1 mL of DMF was slowly added. The resulting polymer solution was left reacting overnight at 50° C. while stirring, followed by the deprotection of the amine and purification as described for polymer A.

Polymer F poly(acrylic acid)-g-(PEG, 1,6-hexanediamine, 3-aminopropyl-dimethylethoxysilane, nitrodopamine) (2000:116.2:161.3:198.2 Mr; 0.15:0.425:0.2125: 0.2125 d): postmodification with N-Boc-1,6-hexanediamine hydrochloride was as described in polymer B. Afterwards a solution of 3-aminopropyldimethylethoxysilane (11.43 mg, 0.071 mmol) and triethylamine (29.62 µL, 0.21 mmol) in 1 mL of DMF was added dropwise and left stirring overnight at 50° C. A last solution of excess nitrodopamine (41.97 mg, 0.142 mmol) in DMF (1 mL) and triethylamine (59.24 µL, 0.43 mmol) was added dropwise. The resulting polymer solution was left reacting overnight at 50° C. while stirring, followed by the deprotection of the amine and purification as described for polymer A.

Polymer G poly(acrylic acid)-g-(PEG, 3-aminopropyl-dimethylethoxysilane, nitrodopamine) (2000:161.3:198.2 Mr; 0.15:0.425:0.425 d): 22.85 mg (0.142 mmol) of 3-aminopropyldimethylethoxysilane previously dissolved in 1 mL of DMF and containing excess triethylamine (59.24 µL, 0.425 mmol) was added to a solution of poly(acrylic acid)-g-(PFPAc, PEG) (238.11:2000 Mr; 0.85:0.15 d). After reacting overnight at 50° C. under stirring a new solution of excess nitrodopamine (83.94 mg, 0.283 mmol) and triethylamine (59.24 µL, 0.43 mmol) in 1 mL of DMF was added dropwise. The resulting polymer solution was left to react overnight at 50° C. while stirring, followed by the deprotection of the amine and purification as described for polymer A.

Polymer H poly(acrylic acid)-g-(PEG, 3-aminopropyl-dimethylethoxysilane) (2000:161.3 Mr; 0.15:0.85 d): excess of 3-aminopropyldimethylethoxysilane (0.425 mmol, 68.56) and triethylamine (1.275 mmol, 177.71 µL) was added to a 2 mL solution of poly(acrylic acid)-g-(PFPAc, PEG) (238.11:2000 Mr; 0.85:0.15 d) as prepared in Example 2. The reaction was left overnight stirring at 50° C. Purification was performed as described for polymer A.

Polymer I poly(acrylic acid)-g-(PEG, nitrodopamine) (2000:198.2 Mr; 0.15:0.85 d): 167.88 mg of excess nitrodopamine (0.57 mmol) and 236.95 µL of triethylamine were dissolved in 2 mL of DMF and added to a solution of poly(acrylic acid)-g-(PFPAc, PEG) (238.11:2000 Mr; 0.85: 0.15 d) and left to react at 50° C. under stirring overnight. Purification was performed as described for polymer A.

Polymer J poly(acrylic acid)-g-(PEG, 12-aminododecylphosphonate) (2000:265.3 Mr; 0.15:0.85 d): 170.66 mg of excess 12-aminododecylphosphonate-bistrimethylsilylester (0.57 mmol) and 236.95 µL of triethylamine (1.7 mmol) were dissolved in 2 mL of DMF and added to a solution of poly(acrylic acid)-g-(PFPAc, PEG) (238.11:2000 Mr; 0.85:0.15 d) and left to react at 50° C. under stirring overnight. Purification was performed as described for polymer A.

Polymer K poly(acrylic acid)-g-(PEG, ethanolamine) (2000:61.1 Mr; 0.15:0.85 d): 34.61 mg of excess ethanolamine (0.57 mmol) and 118.47 µL of triethylamine (0.85 mmol) were dissolved in 2 mL of DMF and added to a solution of poly(acrylic acid)-g-(PFPAc, PEG) (238.11:2000 Mr; 0.85:0.15 d) and left to react at 50° C. under stirring overnight. Purification was performed as described for polymer A.

Example 4: Polymer A, C, E or I on $TiO_2$ 20 nm $TiO_2$ sputter coated Si-wafers were sonicated 2×15 min in toluene, 2×15 min in 2-propanol, dried under a stream of $N_2$ and $O_2$-plasma cleaned for 2 min.

Samples were then immersed overnight (in dark at room temperature) in a 0.1 mg/mL solution (1 mM HEPES buffer, pH=7.4) of polymers A, C, E or I. Upon adsorption, the samples were rinsed once with the above-mentioned buffer, once with water and dried under a stream of $N_2$. Thicknesses of the samples were measured before and after incubation by ellipsometry.

Subsequently, in order to test adlayer stability, the samples were immersed overnight (at RT) in sodium chloride solutions at pH 7.4 with different ionic strength. Two ionic concentrations were used: a low concentrated one of 0.16M and 10 mM HEPES buffer (HEPES II) and a 2M solution. The samples were then removed from the salt solution, rinsed once with 1 mM HEPES buffer, once with water and dried under a stream of $N_2$. The adlayer thickness was then measured by ellipsometry.

Finally, the samples were re-immersed in HEPES II for 15 min and exposed to human serum (Precinorm Roche) for 30 min. During incubation, the samples were stored under ambient conditions without agitation. After exposure, the samples were rinsed twice with HEPES II buffer followed by ultrapure water and dried under a stream of $N_2$. The protein uptake was determined again by ellipsometry.

FIG. 1 shows Adsorption and stability (exposure to solution) and protein resistance results on titanium oxide surfaces of four post-modified polymers: polymer A (Amine), polymer E (Amine-Ethanolamine), polymer C (Amine-Nitrodopamine) and polymer I (Nitrodopamine). The graph on the left shows the results of the polymeric coatings when exposed to a low ionic strength medium (HEPES II 0.16 M) during the stability test step, while on the right they were exposed to a high ionic strength medium (NaCl 2M).

Results show the predictable formation of a polymeric film thickness depending on the type of chemistry used for binding. In the case where solely electrostatic binding was involved (amine and amine-ethanolamine) the initial adlayer thickness, around 1.75 nm, was not maintained even after overnight exposure in low ionic strength medium (HEPES II—H2). This is an expected result, as the salts are known to screen the repulsion between charged segments of the polymer and the electrostatic interaction between the film and the substrate.

Loosing the electrostatic attraction to the surface, the polymers start to coil and eventually desorb from the surface, leading to a decrease in thickness. However the value obtained after H2 immersion (around 1 nm) seems sufficient to maintain the protein resistance of the functionalized surface, while after an exposure to the 2M salt solution, the samples are not protein resistant anymore.

The maximum thickness was obtained when both the amine and the nitrodopamine are present and it prevailed after exposure to both low and high ionic strength media. Similar stability was also observed in the case where only nitrodopamine was used as a binding group to the titania but with lower thickness values. Nevertheless, total protein resistance was obtained only in the former case independently of the ionic strength the surfaces were exposed to. This fact suggests that the presence of long range interactions (electrostatic forces) are needed both to act as a driving force for the polymer to reach the substrate and assemble itself but also for it to adopt the optimal conformation for a nonfouling surface with PEG exposed to the solution-surface interface. Covalent binding is equally necessary specially to enhance the stability of the adlayer under harsh conditions such as high ionic strength.

Example 5: Polymer A, E, B and H on $SiO_2$

One side polished Si-wafers were cleaned, adlayer of four polymers (Polymer A, E, B and H) were prepared, stability test and protein resistance were performed all following the protocol of Example 4. The adlayer thickness after the different steps was determined by ellipsometry.

Figure 2:
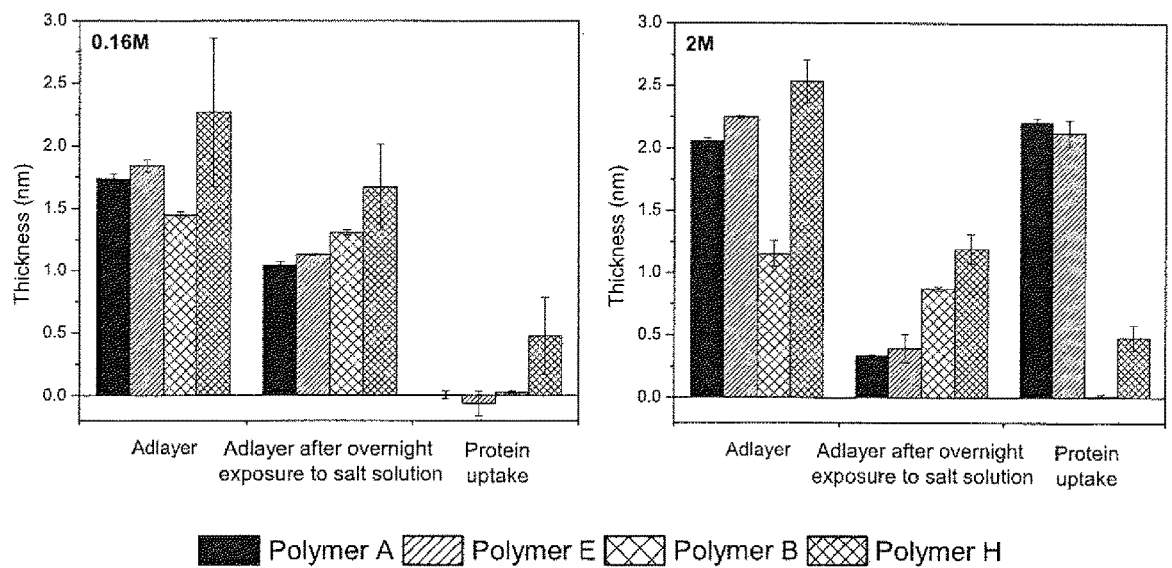

FIG. 2 shows Adsorption and stability (exposure to solution) and protein resistance results on silicon oxide surfaces of four post-modified polymers: polymer A (Amine), polymer E (Amine-Ethanolamine), polymer B (Amine-Silane) and polymer H (Silane). The graph on the left shows the results of the polymeric coatings when exposed to a low ionic strength medium (HEPES II 0.16 M) during the stability test step, while on the right they were exposed to a high ionic strength medium (NaCl 2M).

The trend observed in the previous example for the first two tested polymers A and F (amine and amine-ethanolamine) is the same as for $TiO_2$ as both substrates have negatively charged interfaces at neutral pH. When silane is added to the reactive backbone along with amine (polymer B) there is a slight reduction of the thickness of the adlayer after the stability test but protein resistance is maintained whether the functionalized surface has been exposed to low or high ionic strength medium. This shows that the polymer architecture is ideal and stable, much as in the previous case of polymer C (amine-nitrodopamine—see FIG. 1) on $TiO_2$. When just having silane as a binding group, although ideal for a silicon oxide surface, the initial adlayer adopts a relatively higher thickness than all the other polymers, indicating that a different conformation of the polymer is obtained that is not protein resistant in any of the cases. It is polymer B with groups that bind both electrostatic and covalently to the surface that outperforms all the other combinations for the reasons stated in the previous example.

Example 6: Polymer A, E, D and J on $TiO_2$ 20 nm $TiO_2$ sputter coated Si-wafers were cleaned, adlayer of four polymers (Polymer A, E, D and J) were prepared, stability test and protein resistance were performed all following the protocol of Example 4. The adlayer thickness was determined by ellipsometry after the different steps.

Figure 3:
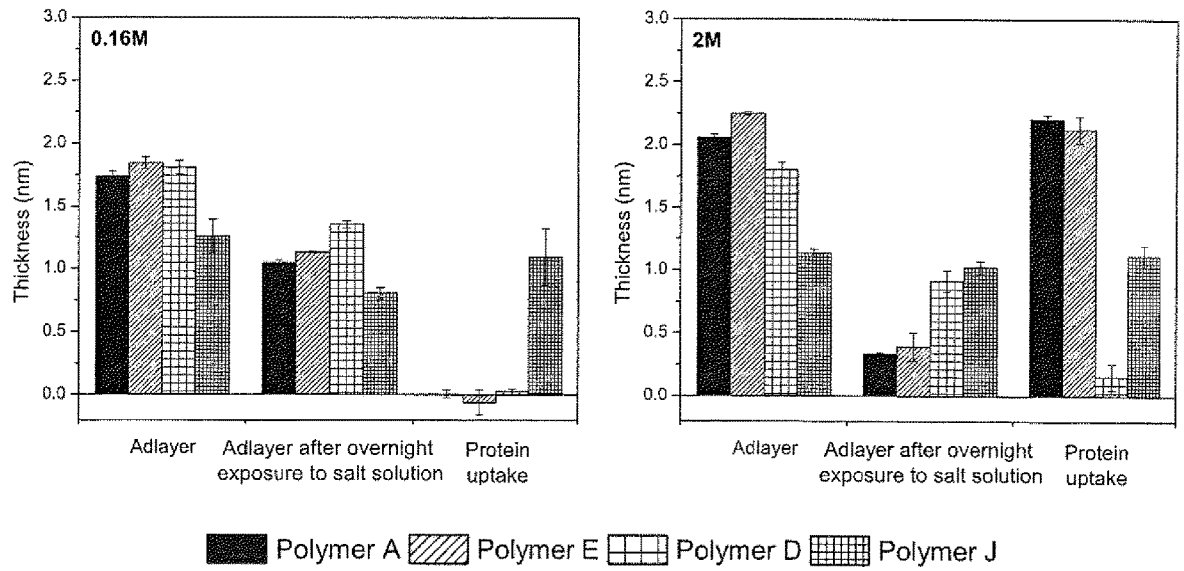

FIG. 3 shows Adsorption and stability (exposure to solution) and protein resistance results on titanium oxide surfaces of four post-modified polymers: polymer A (Amine), polymer E (Amine-Ethanolamine), polymer D (Amine-Phosphonate) and polymer J (Phosphonate). The graph on the left shows the results of the polymeric coatings when exposed to a low ionic strength medium (HEPES II 0.16 M) during the stability test step, while on the right they were exposed to a high ionic strength medium (NaCl 2M).

Similarly to example 4, in the case where the surfaces were exposed to H2 for stability, there is an overall loss in initial thickness but all combinations containing the electrostatic contribution revealed to be protein resistant. This again shows that the latter has an important role when it comes for the polymer to adopt the optimal conformation to this end (nonfouling). When exposing the surfaces to a higher ionic strength medium then all surfaces loose their ability to prevent fouling. The same did not happen with the other titania-selective group nitrodopamine, which indicates this latter forms a more stable bond with the substrate than the phosphonate group.

Example 7: Polymer A, E, F1, F2* and G on $TiO_2$ and $SiO_2$

Both substrates, one side polished Si-wafers and 20 nm $TiO_2$ sputter coated Si-wafers were cleaned as described previously and adlayers of five polymers (Polymer A, E, F1, F2* and G) were prepared. Similarly as in the previous examples, stability test and protein resistance were performed following the protocol of Example 4 where the adlayer thickness was determined by ellipsometry after the different steps.
*Polymer F (F1, F2) was synthesized in two different ways where the covalent groups (silane and nitrodopamine) were added in opposite order.

Figure 4:
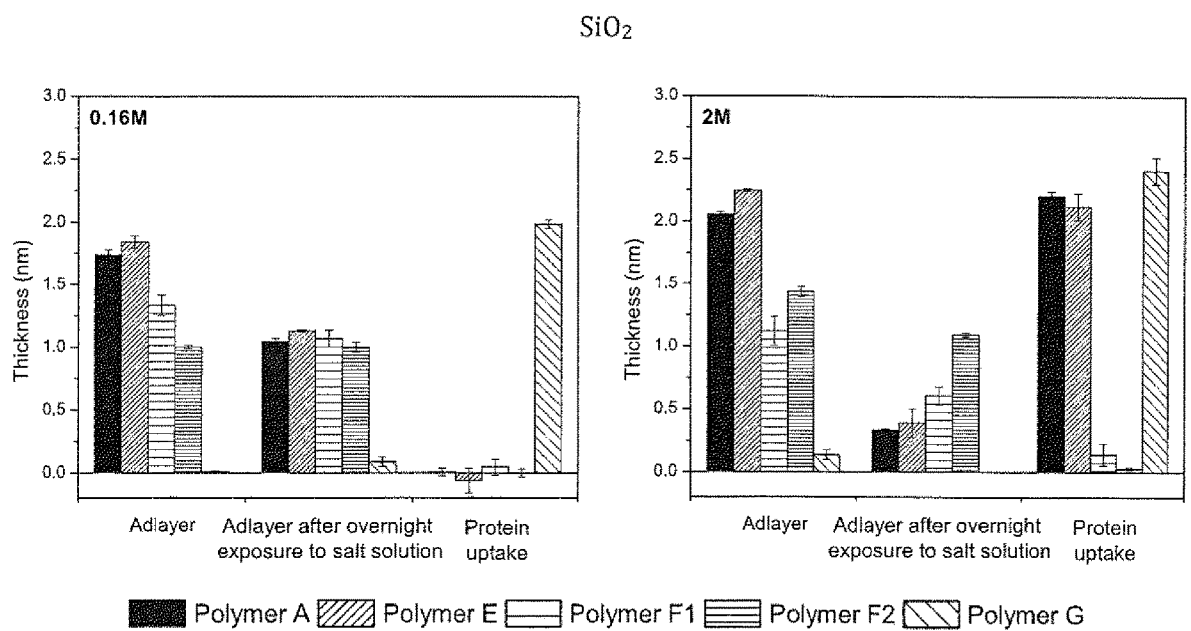

FIG. 4 shows adsorption and stability (exposure to solution) and protein resistance results on silicon oxide surfaces of five post-modified polymers: polymer A (Amine), polymer E (Amine-Ethanolamine), polymer F1 (Amine-Nitrodopamine-Silane), Polymer F2 (Amine-Silane-Nitrodopamine) and polymer G (Silane-Nitrodopamine). The graph on the left shows the results of the polymeric coatings when exposed to a low ionic strength medium (HEPES II 0.16 M) during the stability test step, while on the right they were exposed to a high ionic strength medium (NaCl 2M).

Figure 5:
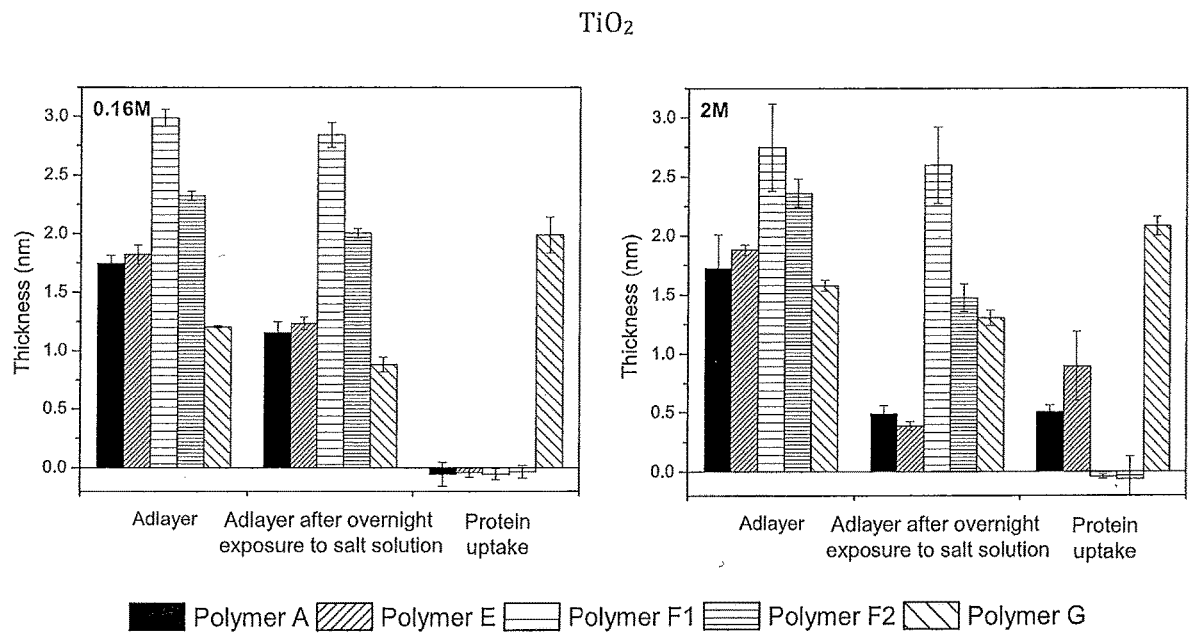

FIG. 5 shows adsorption and stability (exposure to solution) and protein resistance results on titanium oxide surfaces of five post-modified polymers: polymer A (Amine), polymer E (Amine-Ethanolamine), polymer F1 (Amine-Nitrodopamine-Silane), Polymer F2 (Amine-Silane-Nitrodopamine) and polymer G (Silane-Nitrodopamine). The graph on the left shows the results of the polymeric coatings when exposed to a low ionic strength medium (HEPES II 0.16 M) during the stability test step, while on the right they were exposed to a high ionic strength medium (NaCl 2M).

For both substrates, and as already explained in examples 4, 5 and 6, the surfaces that possess an electrostatic driven polymeric conformation showed no protein uptake after being exposed to H2. As polymer G contains no amines attached to the backbone, even so it adsorbs, the polymer is not organized in a way that the PEG side chains adopt a brush-like structure and hence the surface is not protein resistant.

After exposing the surfaces to a 2M salt solution the polymers without groups that can attach to $SiO_2$ or $TiO_2$ covalently, or have no electrostatic contribution (Polymers A, E and G), they do not retain their resistance to human serum. The foreseen exceptions are the two variations of polymer F. When adding first the silane and then nitrodopamine, the resulting polymer maintains its resistance on both substrates even after an exposure to a high ionic strength medium. The same does not happen when adding first the nitrodopamine and then the silane. In this case its nonfouling ability is only maintained on $TiO_2$. This is an indication that the addition order of the chemicals while postmodifying PPFPAc does play a role, presumably due to the bulkiness of the dopamine group which, after attachment, might promote steric hindrance limiting the access of the silane group to the ester. This might be an explanation why on $SiO_2$ the resistance of polymer F1 (amine-nitrodopamine-silane) polymer was not maintained: there was not enough silane groups to guarantee a stable covalent bond throughout the polymeric backbone.

Example 8: Stability Against Acid

The influence of pH on stability/desorption of polyelectrolytes is a well known and common assay to be performed. In this example, and following the protocol described in Example 4, two polymer combinations were used to functionalize both $SiO_2$ and $TiO_2$ and before exposed to human serum, their stability was tested by immersing the surfaces in a glycine-HCl (10 mM-pH=2.4) buffer for 30 min at room temperature. Results are shown in FIG. 6.

Figure 6:
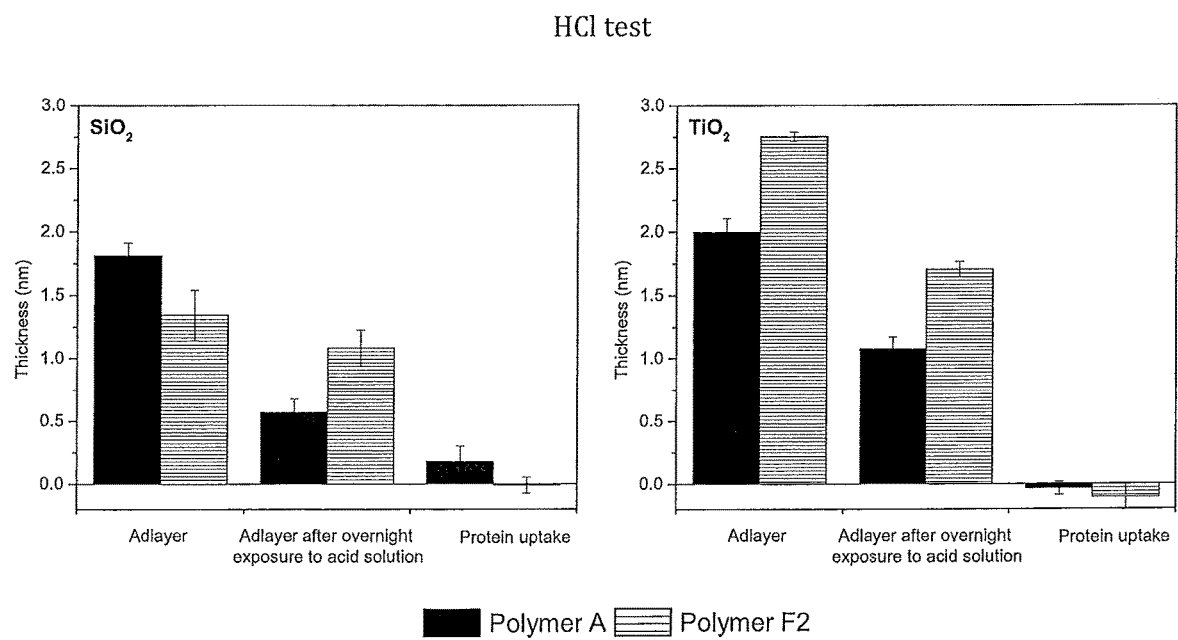

FIG. 6 shows adsorption and stability (exposure to an acidic solution glycine-HCl 10 mM-pH=2.4 overnight) and protein resistance results of two post-modified polymers: polymer A (Amine) and polymer F (Amine-Nitrodopamine-Silane). The graph on the left shows the results on silicon oxide surfaces while the graph on the right shows the data on titanium oxide surfaces.

The data presented in FIG. 6 reveals that both polymeric combinations on both substrates suffer a reduction of their absolute thickness after exposure to the acid solution. Nevertheless, the cases where an adlayer of at least 1 nm remains after the stability test, protein resistance is maintained. The latter includes polymer F on both substrates and polymer A on $TiO_2$, confirming the importance of having a balance between electrostatic and covalent binding to both stabilize and maintain the nonfouling ability of the coating in this particular assay.

Example 9: Stability Against Surfactants

The effect of surfactants on polymer adlayer stability was tested by exposing surfaces functionalized with polymer A (full electrostatic binding to both $SiO_2$ and $TiO_2$) and polymer F (mix of electrostatic and covalent bonds to the metal surfaces) to an anionic and cationic surfactant, SDS and CTAB respectively, at 0.5% w/v for 30 min. The surfaces were modified according to the protocol described in Example 4 and after the stability test was performed, their protein resistance was assessed in a similar way as described previously.

Figure 7:
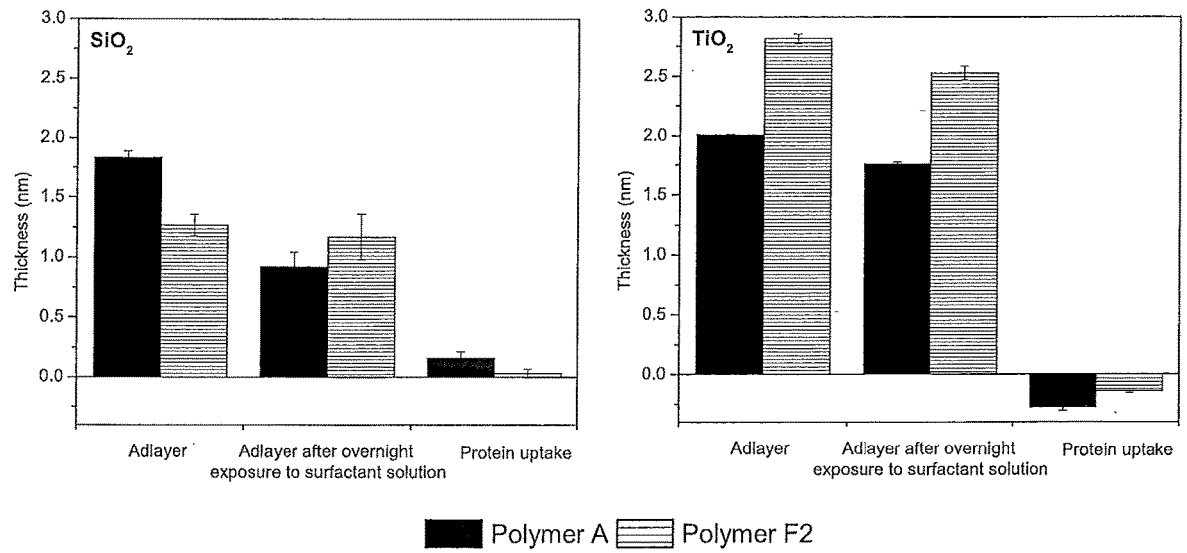

FIG. 7 shows adsorption, stability (exposure to the cationic CTAB surfactant) and protein resistance results of polymer A and polymer F. The graph on the left shows the results on silicon oxide surfaces while the graph on the right shows the data on titanium oxide surfaces. As can be observed in FIG. 7, polymer A's exposure to a cationic surfactant (CTAB) has a larger effect on the adlayer on SiO2 than on TiO2. In the first case the thickness obtained after the test was below 1 nm, which translated into protein uptake, while in the case of titania the thickness before and after CTAB exposure did not differ much, allowing the coating to maintain its protein resistance. One could state that there is a more relevant adsorption competition between surfactant and polymer in the case of the negatively charged silicon oxide than on titania, which is closer to its isoelectric point under these conditions.

Figure 8:
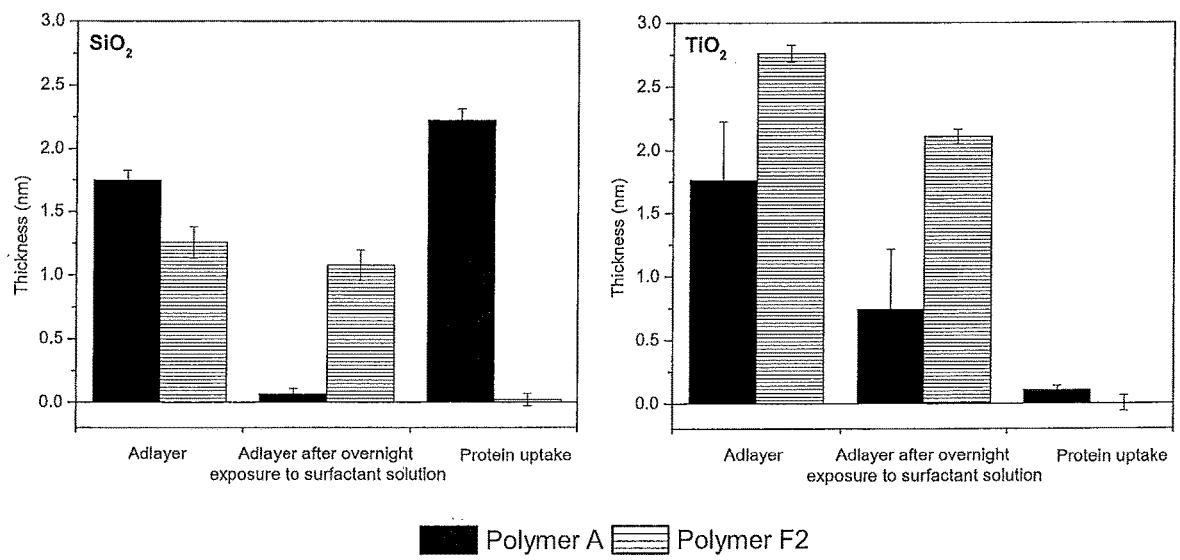

FIG. 8 shows Adsorption, stability (exposure to the anionic SDS surfactant) and protein resistance results of polymer A and polymer F. The graph on the left shows the results on silicon oxide surfaces while the graph on the right shows the data on titanium oxide surfaces. In the case of SDS (see FIG. 8), polymer A results show a considerable decrease in thickness on both substrates (again more pronounced in the SiO2 case), which explains the protein uptake. In this case the cationic polymer adlayer is now displaced from the substrate by the anionic surfactant. Although the polymer layer is just bound electrostatically to both metal surfaces, it is clear that in the two cases the layer's structure is more stable on TiO2 than on SiO2. However when polymer F on SiO2 or TiO2 are exposed to the two surfactants (see both FIG. 7 and FIG. 8), the graphs clearly show that the stability of the polymeric coating is not compromised and it maintains its protein resistance. This is due to the covalent bonds formed (silane on SiO2, nitrodopamine on TiO2) which prevent significant polymer desorption from the surface during surfactant exposure.

The invention claimed is:

1. Method for preparing a functional polymer, the polymer having the general formula (1),

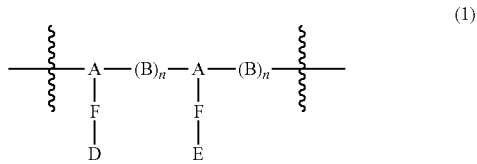

(1)

where:
A is at least a monosubstituted alkylene or arylene group,
B is an amide, an ester or an ether group, and n is either 0 or 1,
F is selected from the group consisting of an ester, a secondary amine, an amide, an ether, a thio ether, a thio ester, and is the same or different for the different types of side chains,
D is a side chain that reversibly binds to a substrate or has a coating function, D being selected from the group consisting of:
 (i) a short chain side chain D1 having a linear or branched, substituted or unsubstituted $C_1$ to $C_{12}$ alkyl group $R_{D1}$ which optionally comprises heteroatoms and which carries at least one functional group K1, the at least one functional group K1 being selected from the group consisting of amines, carboxy, poly(propylene sulfide), and thioethers,
 (ii) a side chain D2 having a long chain $R_{D2}$ selected from the group consisting of polydimethylsiloxane, perfluoroethers, perfluoroalkyls, polyisobutene, polydimethylacrylamide, polyvinylpyrrolidone, polyalkyloxazolines, dextran, carboxymethyl dextran, poly(N-isopropylacrylamide), poly(N-hydroxyethylacrylamide), poly(2-hydroxyethyl methacrylate), poly-hydroxypropylmethacrylate), poly-(methacryloyloxylethyl phosphorylcholine), poly-(sulfobetaine methacrylate), polyalkylene residues having more than 20 carbon atoms, peptide chains, DNA fragments, and poly-(sulfobetaine acrylamide), whereby D2 has no functional end group or side group K1, K3, or K4, and
 (iii) a side chain D3 having a long chain $R_{D3}$ selected from the group consisting of a polydimethylsiloxane, perfluoroethers, perfluoroalkyls, polyisobutene, polydimethylacrylamide, polyvinylpyrrolidone, polyalkyloxazolines, dextran, carboxymethyl dextran, poly(N-isopropylacrylamide), poly(N-hydroxyethylacrylamide), poly(2-hydroxyethyl methacrylate), poly-hydroxypropylmethacrylate), poly-(methacryloyloxylethyl phosphorylcholine), poly-(sulfobetaine methacrylate), polyalkylene residues having more than 20 carbon atoms, peptide chains, DNA fragments, and poly-(sulfobetaine acrylamide), D3 carrying at least one functional end or side group K3, K3 being selected from the group consisting of amines, carboxy, fluorescence markers, antibodies, biotin, nitrilotriacetic acid (NTA), peptides, and a single stranded DNA fragment, E is a side chain that irreversibly binds to a substrate, the side chain E having either a linear or branched, substituted or unsubstituted $C_1$ to $C_{20}$ alkyl group $R_E$, which optionally comprises heteroatoms and carries at least one functional end group K4, or is the functional end group K4, K4 being selected from the group consisting of alkoxy silanes, chloro silanes, chloro silanes, phosphates, and perfluorophenyl azides, the alkoxy silanes being a compound of formula (8):

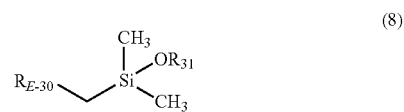

(8)

where E-30 is a linear or branched, saturated, or unsaturated alkyl chain connecting the linker group F and the alkoxy silane group of formula (8), and $R_{31}$ is selected from the group consisting of methyl, ethyl, propyl, and isopropyl,
the polymer comprises 1 to 10 different types of side chains D and 1 to 10 different types of side chains E, the polymer comprising a plurality of each of the different types of side chains, the different types of side chains being randomly or regularly distributed in the polymer,
the polymer comprises (i) at least 1 type of side chain D1 (ii) at least 1 type of side chain E, and (iii) at least 1 type of side chain D2 and/or at least 1 type of side chain D3, the method comprising:
post-modifying a polymer backbone comprising reactive groups G with at least two different side groups by adding the at least two different side groups sequentially to the polymer backbone so that group F is formed by reaction of a reactive group G on the polymer backbone with a reactive group H on the side chain D or E,
wherein the reactive groups G on the polymer backbone are selected from the group consisting of esters, activated esters, chloro, fluoro, acrylate, methacrylate, NHS esters, epoxides, anhydrides, azides, alkines, and acyltrifluoroborates,
the reactive group H is selected from the group consisting of an amine, an alcohol, and a thiol,
essentially all recative groups of the polymer backbones result in the linker group F comprising the side chain D or E, and
at least one of side chain D2 and/or D3 are added to the polymer backbone first, and subsequently the side chains D1 and/or E are added.

2. Method according to claim 1, wherein A is a monosubstituted alkylene or arylene group.

3. Method according to claim 1, wherein A is a monosubstituted alkylene group.

4. Method according to claim 1, wherein group F is the same for the different types of side chains.

5. Method according to claim 1, wherein group F is an amide for all different types of side chains.

6. Method according to claim 1, wherein n is 0.

7. Method according to claim 1, wherein the reactive group G is (i) connected directly to a carbon atom of the polymer backbone, or (ii) a methylene group, an ethylene group, or a propylene group is between the carbon atom of the polymer backbone and the reactive group G.

8. Method according to claim 1, wherein the functional group K1 in side chain D1 is terminal.

9. Method according to claim 1, wherein the functional group K1 is selected from the group consisting of amines, thioethers, and carboxy.

10. Method according to claim 1, wherein side chain D2 is selected from the group of consisting of polydimethylacrylamide and polyalkyloxazoline.

11. Method according to claim 1, wherein the functional group in side chain E is an alkoxy silane or a chloro silane.

12. Method according to claim 1, wherein at least one of $R_{D1}$ in side chain D1 and $R_E$ in side chain E is selected from the group consisting of methylene, ethylene, propylene, butylene, pentylene, hexylene, heptylene, octylene, nonylene, decylene, undecylene dodecylene, —($CH_2$)—CH(COOH)—, —C(=O)—O—($CH_2$)$_n$—, and —C(=O)—NH—($CH_2$)$_n$—, and n is 1 to 8.

13. Method according to claim 1, wherein the polymer comprises 2 to 8 different types of side chains D and 1 to 5 different types of side chains E.

14. Method according to claim 1, wherein the polymer comprises 2 to 5 different types of side chains D and 1 or 2 different types of side chains E.

15. Method according to claim 1, wherein the polymer backbone, before carrying out the post-modification reaction, is a pentafluorophenol ester or a pentachlorophenol ester.

16. Method according to claim 1, wherein the polymer backbone, before carrying out the post-modification reaction, has the following structure:

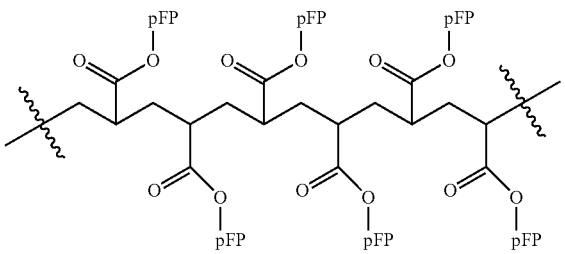

where pFP is pentafluorophenyl.

* * * * *